(12) United States Patent
Lee et al.

(10) Patent No.: US 8,577,121 B2
(45) Date of Patent: Nov. 5, 2013

(54) FORGED SEAL IMPRINT INSPECTION METHOD AND RECORDING MEDIUM

(75) Inventors: Joong Lee, Seoul (KR); Young Su Lee, Seoul (KR); Jun Suk Kim, Seoul (KR); Ki Woong Moon, Seoul (KR); Byung Wook Park, Seoul (KR)

(73) Assignee: Republic of Korea (National Forensic Service Director Ministry of Public Administration and Security), Seoul (KR)

( * ) Notice: Subject to any disclaimer, the term of this patent is extended or adjusted under 35 U.S.C. 154(b) by 442 days.

(21) Appl. No.: 12/957,358

(22) Filed: Nov. 30, 2010

(65) Prior Publication Data

US 2011/0231131 A1 Sep. 22, 2011

(30) Foreign Application Priority Data

Mar. 17, 2010 (KR) .......................... 10-2010-0023786
Apr. 21, 2010 (KR) .......................... 10-2010-0037066

(51) Int. Cl.
*G06K 9/00* (2006.01)

(52) U.S. Cl.
USPC ........... 382/141; 382/100; 382/294; 382/318; 702/83

(58) Field of Classification Search
USPC ......... 382/100, 112, 135, 141, 227, 294, 318; 702/83
See application file for complete search history.

(56) References Cited

U.S. PATENT DOCUMENTS

| 5,159,646 | A * | 10/1992 | Kumagai | 382/225 |
|---|---|---|---|---|
| 5,164,997 | A * | 11/1992 | Kumagai | 382/294 |
| 5,490,225 | A * | 2/1996 | Kumagai | 382/227 |
| 6,351,550 | B1 * | 2/2002 | Inaoka et al. | 382/135 |
| 6,987,868 | B1 * | 1/2006 | Atarashi et al. | 382/112 |
| 2010/0023758 | A1 * | 1/2010 | Han et al. | 713/156 |
| 2011/0231131 | A1 * | 9/2011 | Lee et al. | 702/83 |

FOREIGN PATENT DOCUMENTS

KR 10-1999-0041478 A 6/1999

OTHER PUBLICATIONS

English Language Abstract of KR 10-1999-0041478 A.

* cited by examiner

*Primary Examiner* — Gregory M Desire
(74) *Attorney, Agent, or Firm* — Rabin & Berdo, P.C.

(57) ABSTRACT

Disclosed herein is a forged seal imprint checking method which includes a step ST-101 of generating a reference seal imprint from a genuine seal (ST-110) and a step ST-121 of comparing a compared seal imprints with the reference seal imprint to calculate characteristic values of the compared seal imprint with respect to the reference seal imprint (ST-140). According to experimental results, forged seal imprints obtained by seals forged by etching a zinc plate or a resin plate can be recognized and forged seal imprints generated by seals forged through computer copy can be also recognized. Accordingly, an objective basis on which it can be determined whether seal imprints on documents are forged in civil and criminal cases can be provided to prevent errors which may be generated when seal imprints are inspected with the naked eyes or microscopes.

9 Claims, 21 Drawing Sheets

110′

123′

FORGED SEAL IMPRINT INSPECTION METHOD AND RECORDING MEDIUM

CROSS-REFERENCE TO RELATED APPLICATIONS

The present application claims priority under 35 U.S.C. 119 of Korean Patent Application No. 10-2010-0023786, filed on Mar. 17, 2010, and Korean Patent Application No: 10-2010-0037066, filed on Apr. 21, 2010, the disclosures of which are expressly incorporated by reference herein in their entirety.

BACKGROUND OF THE INVENTION

1. Field of the Invention

The present invention relates to a forged seal imprint inspection method for inspecting whether a seal imprint on a document or the like is forged, and more particularly, a forged seal imprint inspection method for calculating characteristic values of a compared seal imprint on a document or the like to provide objective data for determining whether the compared seal imprint is forged and a recording medium.

2. Background of the Related Art

A seal has a seal face with a name of a person, a company or an organization engraved thereon and a seal imprint is a mark formed by putting red stamping ink on the seal face of the seal and pressing the seal on paper. Seals originated in Mesopotamia and they were made using stone, clay, bone, shells, etc. and used to indicate possessions of their owners. The seals have been used from Zhou dynasty in china. In Korea, seals of the period of Nacklang were excavated in the area near Daedong-gang and seals of Silla dynasty were discovered in Anapji. Presently, the seals are widely used as an identification means in Korea, Japan and China and used as a document acceptance confirmation means in the West. Since the seals are used for important transactions and identification, seal forgery is increasing.

In the past, a seal was stamped on semitransparent paper, the seal face was attached to a copy seal and the copy seal was manually engraved to forge the seal. However, this method is not currently used because there is a large error between the genuine seal and the forged seal. Recently, photolithography has been widely used. This method photographs a seal imprint formed by stamping a genuine seal and etches a metal plate or a resin plate to generate a copy seal. In this case, there is a large difference between the copy seal or a seal imprint formed using the copy seal and the genuine seal due to an error in the photographing process. According to another method, a seal imprint is scanned and printed on a film, and this print is attached onto a photoactive compound (PAC), printed and dissolved with a solvent to make a copy seal. This copy seal and seal imprints formed by stamping this copy seal are difficult to distinguish from a genuine seal and genuine seal imprints. However, even this copy seal has an error due to excessive or insufficient exposure, excessive or insufficient dissolving in the copying process.

With the development of computers, a method of copying a seal using a seal engraving machine has been proposed recently. This method is a kind of computer aided manufacturing (CAM) and scans a copied seal using a scanner. Then, the method inputs a scanned image to a computer, sets a material having the same size as the copied seal in the seal engraving machine, adjust the size of the material to the copied seal and inputs a command to the computer. Then, a drill or a laser connected to the computer engraves the material according to the input command. A forged seal manufactured by this method is very accurate, and thus there is barely difference between the forged seal and the copied seal. However, an error may be generated during the size adjusting operation or if the copied seal is not located in parallel.

A superimpose inspection method is widely used as a fake seal imprint detecting technique. The superimpose inspection method compares and observes fine scratches, concave portions and convex portions of a genuine seal imprint and a compared seal imprint using a device such as a microscope or magnifies a genuine seal imprint and a compared seal imprint under the same condition, superimposes the compared seal imprint on the genuine seal imprint and observes the seal imprints. While a photographic method using a negative film was widely used in the past, an image processing apparatus such as VSC5000 has been used these days. In addition, a method of manually tracing a compared seal imprint for comparison of contours and a method of extracting a contour through photographing have been used. However, the manual tracing may have a problem in the reproducibility of the process and the contour extraction requires a dedicated optical apparatus or a high-level photographic technique and a long working time. It is difficult for these methods to precisely observe seal imprints due to interference of letters, a depth difference in stamping ink, etc. Furthermore, the above methods inspect seal imprints with the human eye, and thus there is a difference between ordinary people and experts. Even the experts have to inspect seal imprints according to subjective judgment so that the experts may present different judgment results.

SUMMARY OF THE INVENTION

Accordingly, the present invention has been made in view of the above-mentioned problems occurring in the prior art, and it is a primary object of the present invention to provide a forged seal imprint inspection method for generating a reference seal imprint using an original seal, comparing the reference seal imprint with a compared seal imprint so as to calculate characteristic values and generating object data used to determine whether the compared seal imprint is forged from the characteristic values and a recording medium.

To accomplish the above object of the present invention, according to the present invention, there is provided a forged seal imprint inspection method comprising the steps of generating a reference seal imprint from a genuine seal and generating comparative seal imprints from the genuine seal; comparing the comparative seal imprints with the reference seal imprint to calculate characteristic values of the comparative seal imprints and comparing a compared seal imprint with the reference seal imprint to calculate characteristic values of the compared seal imprint; and comparing the characteristic values obtained by comparing the comparative seal imprints with the reference seal imprint with the characteristic values obtained by comparing the compared seal imprint with the reference seal imprint.

In the step of calculating the characteristic values, the position and angle of the reference seal imprint are matched with the position and angle of each comparative seal imprint, the characteristic values of the comparative seal imprint with respect to the reference seal imprint are calculated, the position and angle of the reference seal imprint are matched with the position and angle of the compared seal imprint, and the characteristic values of the compared seal imprint with respect to the reference seal imprint are calculated.

The characteristic values include packing rates with respect to the reference seal imprint, the packing rates of the comparative seal imprints seal imprint are calculated according to $$\rho = 1 - \frac{n(A) - (n(B) - n(B_{out}))}{n(A)}$$

where n(A) represents the area of a seal region of the reference seal imprint, n(B) represents the area of a seal region of each comparative seal imprint, and n($B_{out}$) represents the area of a portion of the seal region of each comparative seal imprint, which is not included in the seal region of the reference seal imprint, and the packing rate of the compared seal imprint is calculated according to $$\rho = 1 - \frac{n(A) - (n(B) - n(B_{out}))}{n(A)}$$

where n(A) represents the area of the seal region of the reference seal imprint, n(B) represents the area of a seal region of the compared seal imprint, and n($B_{out}$) represents the area of a portion of the seal region of the compared seal imprint, which is not included in the seal region of the reference seal imprint.

The characteristic values include error rates with respect to the reference seal imprint, the error rates of the comparative seal imprints are calculated according to $$\varepsilon = \frac{n(B_{out})}{n(B)} \times 100$$

where n($B_{out}$) represents the area of a portion of the seal region of each comparative seal imprint, which is not included in the seal region of the reference seal imprint, and n(B) represents the area of the seal region of each comparative seal imprint, and the error rate of the compared seal imprint is calculated according to $$\varepsilon = \frac{n(B_{out})}{n(B)} \times 100$$

where n($B_{out}$) represents the area of a portion of the seal region of the compared seal imprint, which is not included in the seal region of the reference seal imprint, and n(B) represents the area of the seal region of the compared seal imprint.

The characteristic values include packing rates and error rates with respect to the reference seal imprint, the packing rates of the comparative seal imprints seal imprint are calculated according to $$\rho = 1 - \frac{n(A) - (n(B) - n(B_{out}))}{n(A)}$$

where n(A) represents the area of a seal region of the reference seal imprint, n(B) represents the area of a seal region of each comparative seal imprint, and n($B_{out}$) represents the area of a second portion of the seal region of each comparative seal imprint, the packing rate of the compared seal imprint is calculated according to $$\rho = 1 - \frac{n(A) - (n(B) - n(B_{out}))}{n(A)}$$

where n(A) represents the area of the seal region of the reference seal imprint, n(B) represents the area of a seal region of the compared seal imprint, and n($B_{out}$) represents the area of a second portion of the seal region of the compared seal imprint, the error rates of the comparative seal imprints are calculated according to $$\varepsilon = \frac{n(B_{out})}{n(B)} \times 100$$

where n($B_{out}$) represents the area of a portion of the seal region of each comparative seal imprint, which is not included in the seal region of the reference seal imprint, and n(B) represents the area of the seal region of each comparative seal imprint, and the error rate of the compared seal imprint is calculated according to $$\varepsilon = \frac{n(B_{out})}{n(B)} \times 100$$

where n($B_{out}$) represents the area of a portion of the seal region of the compared seal imprint, which is not included in the seal region of the reference seal imprint, and n(B) represents the area of the seal region of the compared seal imprint.

According to the present invention, there is also provided a forged seal imprint inspection method comprising the steps of generating multiple preparatory seal imprints from a genuine seal; separating each preparatory seal imprint into regions and performing registration on seal regions of the multiple preparatory seal imprints to generate a reference seal imprint; receiving a compared seal imprint to be inspected and separating the compared seal imprint into regions; performing registration on seal regions of the reference seal imprint and the compared seal imprint; and calculating characteristic values of the compared seal imprint with respect to the reference seal imprint.

The registration step obtains shift and rotation parameters by which a matching pixel count becomes a maximum value, and the shift and rotation parameters are calculated according to $$(G\theta, Gx, Gy) = \text{Argmax}(MPC)$$

$$MPC = QT(x, y)T(x, y) = \begin{cases} 1, & \text{if } a_{(x,y)} = 1, b_{(x,y)} = 1 \\ 0, & \text{otherwise} \end{cases}$$

The registration step calculates the area of an overlap portion of the seal regions of the reference seal imprint and the compared seal imprint and matches the position and angle of the reference seal imprint with the position and angle of the compared seal imprint.

The characteristic values include a packing rate with respect to the reference seal imprint, and the packing rate of the compared seal imprint is calculated according to $$\rho = 1 - \frac{n(A) - (n(B) - n(B_{out}))}{n(A)}$$

where n(A) represents the area of the seal region of the reference seal imprint, n(B) represents the area of a seal region of the compared seal imprint, and n($B_{out}$) represents the area of a portion of the seal region of the compared seal imprint, which is not included in the seal region of the reference seal imprint.

The characteristic values include an error rate with respect to the reference seal imprint, and the error rate of the compared seal imprint is calculated according to $$\varepsilon = \frac{n(B_{out})}{n(B)} \times 100$$

where n($B_{out}$) represents the area of a portion of the seal region of the compared seal imprint, which is not included in the seal region of the reference seal imprint, and n(B) represents the area of the seal region of the compared seal imprint.

The characteristic values include packing rates and error rates with respect to the reference seal imprint, the packing rate of the compared seal imprint is calculated according to $$\rho = 1 - \frac{n(A) - (n(B) - n(B_{out}))}{n(A)}$$

where n(A) represents the area of the seal region of the reference seal imprint, n(B) represents the area of a seal region of the compared seal imprint, and n($B_{out}$) represents the area of a portion of the seal region of the compared seal imprint, which is not included in the seal region of the reference seal imprint, and the error rate of the compared seal imprint is calculated according to $$\varepsilon = \frac{n(B_{out})}{n(B)} \times 100$$

where n($B_{out}$) represents the area of a portion of the seal region of the compared seal imprint, which is not included in the seal region of the reference seal imprint, and n(B) represents the area of the seal region of the compared seal imprint.

The packing rate is reflected in the error rate and the error rate in which the packing rate is reflected is calculated according to $$\varepsilon_1 = \frac{\varepsilon}{\rho}$$

According to the present invention, there is also provided a computer readable recording medium recording a program executing a function of generating multiple preparatory seal imprint from a genuine seal and separating each preparatory seal imprint into regions, a function of performing registration on seal regions of the preparatory seal imprints and calculating the average of pixels corresponding to the seal regions to generate a reference seal imprint, a function of receiving a compared seal imprint to be inspected and separating the compared seal imprint into regions, and a function of comparing the compared seal imprint with the reference seal imprint to calculate an error rate representing a difference between the reference seal imprint and the compared seal imprint and a packing rate representing seal intensity and inspecting whether the compared seal imprint is forged.

The error rate is calculated according to according to $$\varepsilon = \frac{n(B_{out})}{n(B)} \times 100,$$

the packing rate is calculated according to $$\rho = 1 - \frac{n(A) - (n(B) - n(B_{out}))}{n(A)}$$

where n(A) represents the area of the reference seal imprint and n($B_{out}$) represents the area of a portion of the compared seal imprint, which is not included in the reference seal imprint, the packing rate is reflected in the error rate according to $$\varepsilon_1 = \frac{\varepsilon}{\rho}$$

when the compared seal imprint is compared with the reference seal imprint.

According to the present invention, there is also provided a forged seal imprint inspection method comprising the steps of calculating the average and standard deviation of corrected error rates ($\varepsilon_1$), error rates ($\varepsilon$)/packing rates ($\rho$), of multiple preparatory seal imprints with respect to a reference seal imprint to generate a normal distribution curve; and calculating a corrected error rate ($\varepsilon_1$), error rate ($\varepsilon$)/packing rate ($\rho$), of a compared seal imprint with respect to the reference seal imprint and representing the corrected error rate of the compared seal imprint on the normal distribution curve of the preparatory seal imprints.

The forged seal imprint inspection method according to the present invention can provide object data used to determine whether a compared seal imprint on a document is stamped by a genuine seal. Furthermore, the forged seal imprint inspection method can provide a standard for detecting a forged seal imprint stamped by a forged seal made by zinc plate etching or resin plate etching and a forged seal imprint stamped by a forged seal made by computer copy. Accordingly, an objective basis upon which to determine whether a seal imprint on a document is forged in civil cases and/or criminal cases can be provided to prevent errors generated in inspection using naked eyes or a microscope.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, the present invention will be described in detail by explaining preferred embodiments of the invention with reference to the attached drawings.

A forged seal imprint inspection method according to an embodiment of the present invention will now be explained.

A conventional forged seal imprint inspection method checks whether a seal imprint on a document is stamped by a genuine seal. Accordingly, an operation of checking whether a seal print on a document is stamped by a genuine seal will be described. An example of a compared seal imprint may include an image obtained by scanning a seal imprint on a document. The genuine seal includes not only a registered seal but also a stamp used to imprint a mark on documents or envelopes of mail matters to confirm dates. Stamping ink which will be described below includes ink coated on stamps as well as red stamping ink adhering to genuine seals. A seal region means a portion to which ink adheres in a seal imprint.

Figure 1:
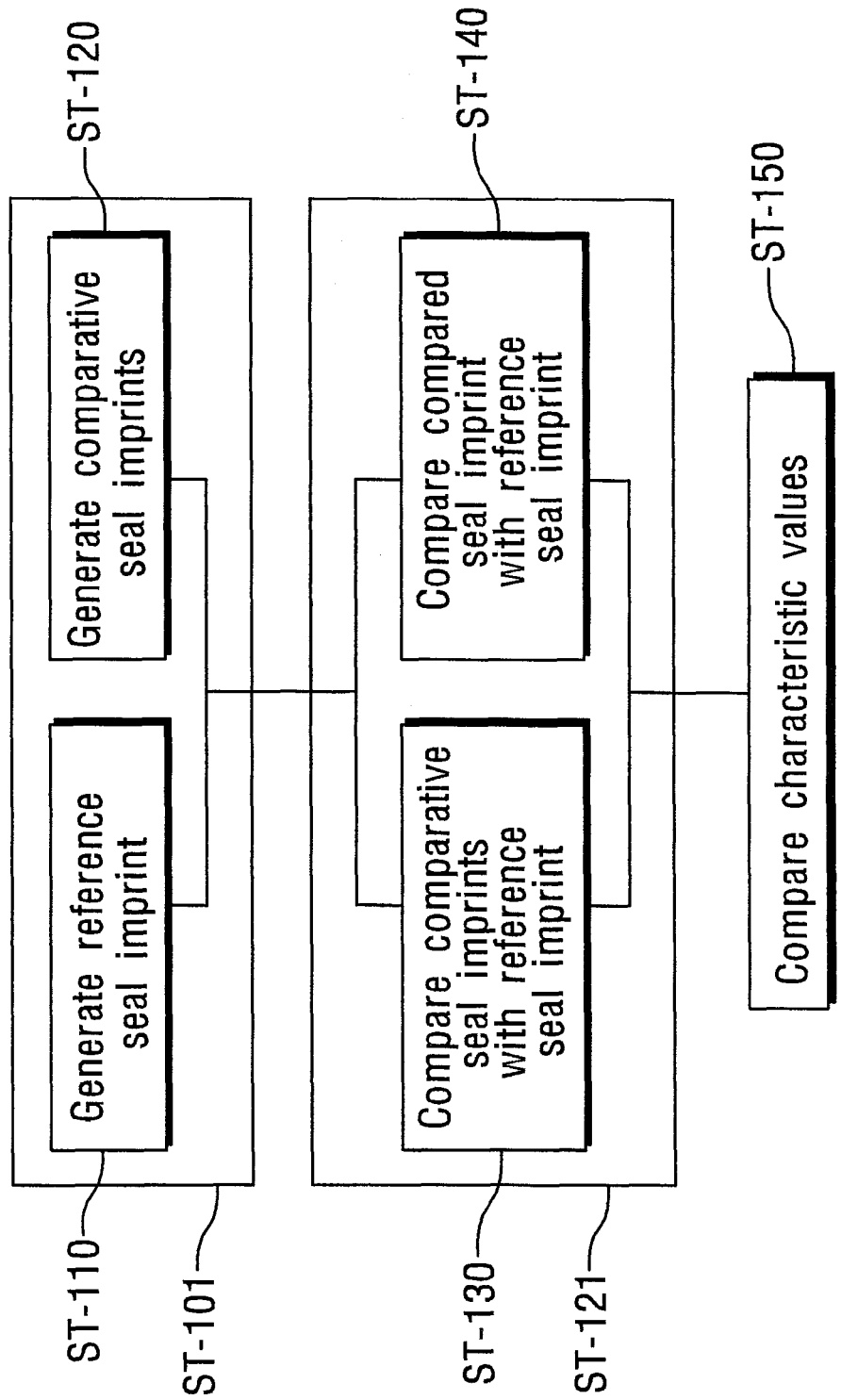
FIG. 1 illustrates a seal imprint comparing method according to the present invention.

Referring to FIG. 1, the forged seal imprint inspection method according to an embodiment of the present invention includes a step ST-101 of generating seal imprints, a step ST-121 of comparing the seal imprints generated in step ST-101 to calculate characteristic values, and a step ST-150 of comparing the characteristic values.

The step ST-101 includes a reference seal imprint generating step ST-110 and a comparative seal imprint generating step ST120.

Figure 2:
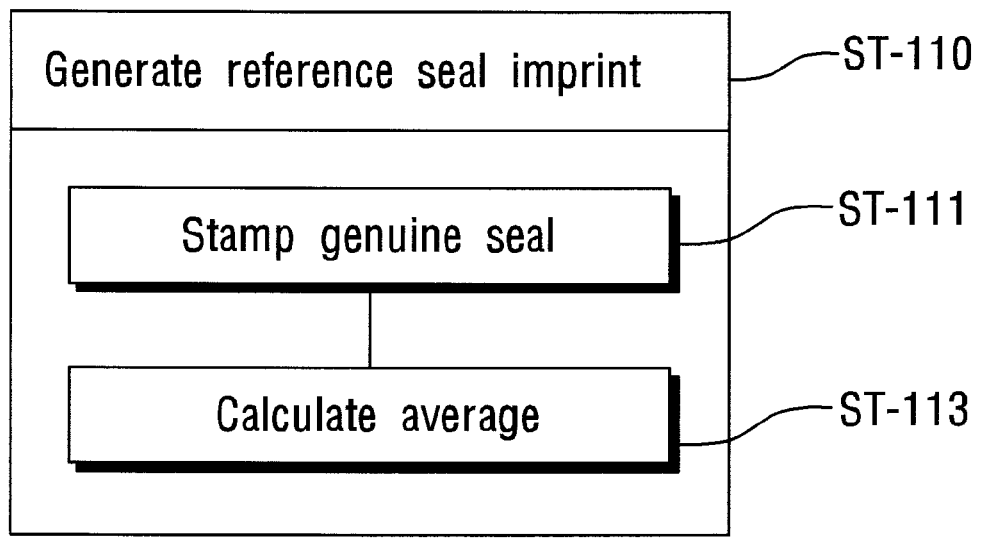
FIG. 2 illustrates a reference seal imprint generating step shown in FIG. 1.
Figure 3:
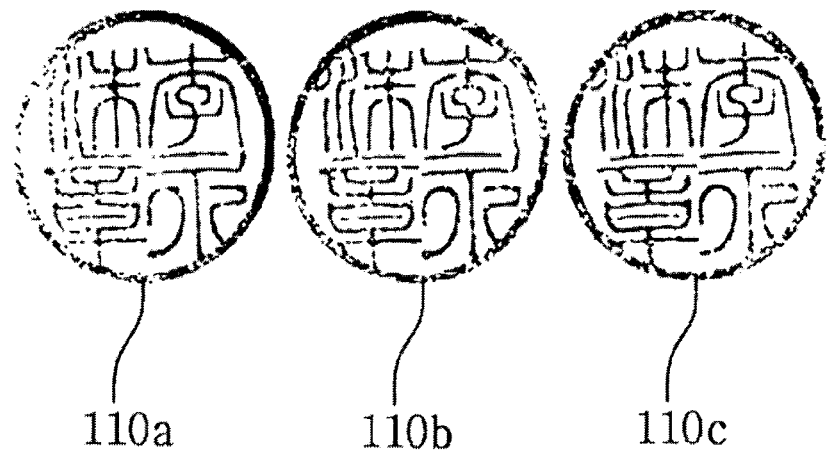
FIG. 3 illustrates exemplary preparatory seal imprints stamped by a genuine seal in order to generate a reference seal imprint.
Figure 4:
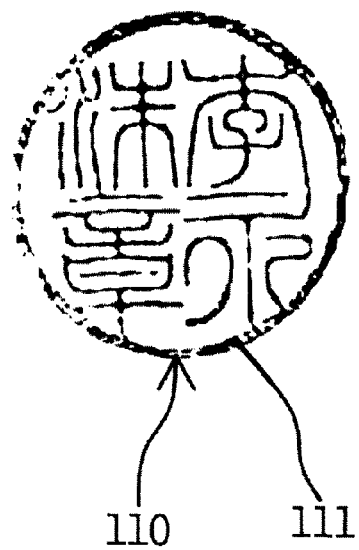
FIG. 4 illustrates an exemplary reference seal imprint generated from the preparatory seal imprints shown in FIG. 3.

Referring to FIGS. 2, 3 and 4, the reference seal imprint generating step ST-110 may stamp a genuine seal on blank paper multiple times in a step ST-111 and scans the seal imprints to generate a plurality of preparatory seal imprints 110a, 110b and 110c. FIG. 3 illustrates the preparatory seal imprints 110a, 110b and 110c obtained by stamping the genuine seal on blank paper three times and scanning the seal imprints.

The average of the preparatory seal imprints 110a, 110b and 110c is calculated in a step ST-113 and a seal imprint having the average is set as a reference seal imprint 110, as shown in FIG. 4. The average corresponds to the average of colors (RGB) of pixels forming the preparatory seal imprints 110a, 110b and 110c. According to experiments, the reference seal imprint 110 used to check whether a compared seal imprint is forged can be obtained if two preparatory seal imprints are generated, that is, when the genuine seal is stamped more than twice.

When the average of the preparatory seal imprints is calculated, rotating angles and displacement of the preparatory seal imprints are controlled to find a point at which an overlapping portion of seal regions of the preparatory seal imprints becomes maximum and the average of pixels corresponding to the point is calculated to generate a reference seal imprint. This method will be explained below.

Figure 5:
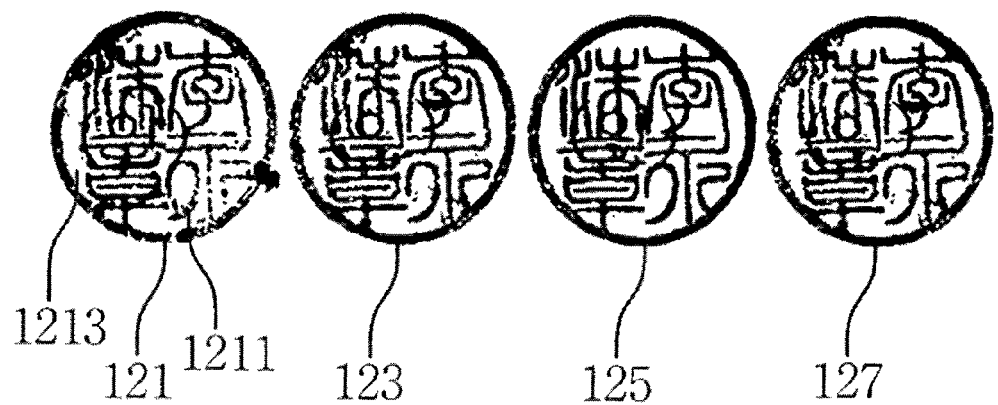
FIG. 5 illustrates exemplary comparative seal imprints stamped by the genuine seal.

The comparative seal imprint generating step ST-120 may stamp the genuine seal on blank paper more than once, preferably, multiple times, and scan the seal imprints so as to generate comparative seal imprints 121, 123, 125 and 127, as show in FIG. 5. The comparative seal imprints 121, 123, 125 and 127 are compared with the reference seal imprint 110 to calculate characteristic values so as to generate a reference value for detecting a forged seal imprint. Although FIG. 5 shows the four comparative seal imprints 121, 123, 125 and 127, the present invention is not limited thereto and at least one comparative seal imprint may be generated.

Referring to FIG. 5, the genuine seal may be stamped on paper on which a letter "(인)" is printed multiple times and the genuine seal imprints may be scanned to generate the comparative seal imprints 121, 123, 125 and 127 including "(인)".

The aforementioned preparatory seal imprints and comparative seal imprints may be generated by stamping the genuine seal on blank paper multiple times and scanning the genuine seal imprints or by stamping the genuine seal on blank paper multiple times and photographing the genuine seal imprints.

Furthermore, a compared seal imprint is a seal imprint to be inspected and may be generated by scanning or photographing a seal imprint. The comparative seal imprints may not be additionally generated and the preparatory seal imprints used to generate the reference seal imprint may be used as comparative seal imprints to calculate characteristic values.

When the reference seal imprint 110 and the comparative seal imprints 121, 123, 125 and 127 are prepared, as shown in FIGS. 4 and 5, the comparative seal imprints 121, 123, 125 and 127 are compared with the reference seal imprint 110 to calculate characteristic values in a step S-130 and a compared seal imprint is compared with the reference seal imprint 110 to calculate characteristic values in a step ST-140. Here, the seal regions of the comparative seal imprints are respectively compared with the seal region of the reference seal imprint 110 to calculate the characteristic values and the seal region of the compared seal imprint is compared with the seal region of the reference seal imprint 110 to calculate the characteristic values.

Figure 6:
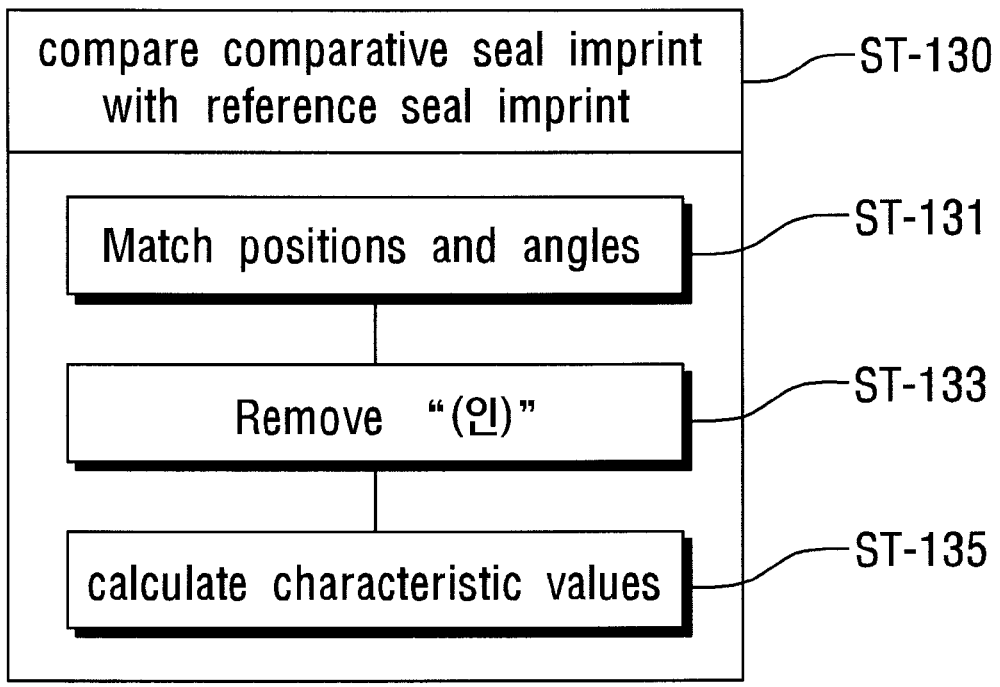
FIG. 6 illustrates an operation of comparing a comparative seal imprint with the reference seal imprint.
Figure 8:
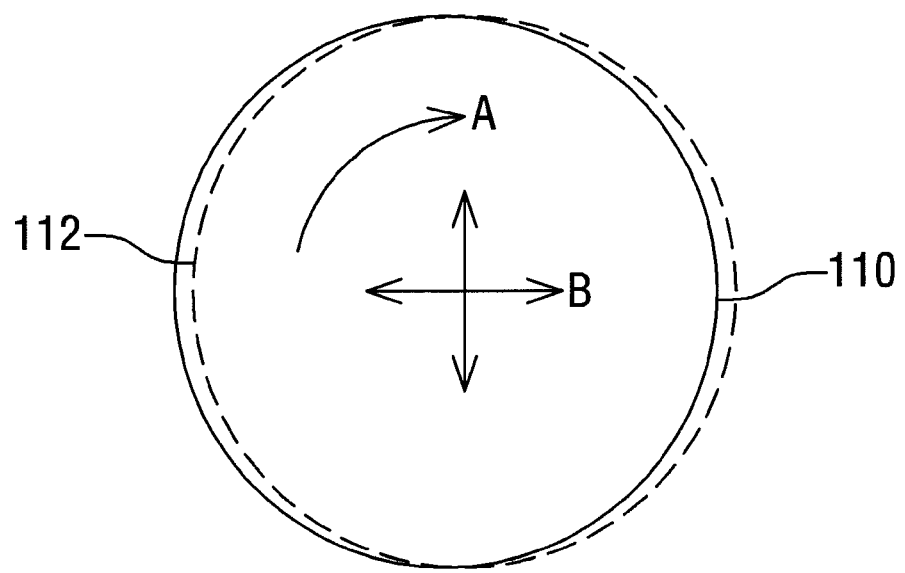
FIG. 8 roughly illustrates the reference seal imprint and a comparative seal imprint in order to explain the operation of matching the position and angle of the reference seal imprint with the position and angle of the comparative seal imprint according to an embodiment of the present invention.

Referring to FIG. 6, the step ST-130 of comparing the comparative seal imprints with the reference seal imprint to calculate the characteristic values includes a step (registration step) ST-131 of matching the positions and angles of the comparative seal imprints with the position and angle of the reference seal imprint before the characteristic values are calculated in step ST-135. An operation of matching the position and angle of the comparative seal imprint 121 with the position and angle of the reference seal imprint 110 will now be explained. The comparative seal imprint 121 is superimposed on the reference seal imprint 110, as shown in FIG. 8, and the area of an overlap portion of the seal region 111 of the reference seal imprint 110, shown in FIG. 4, and the seal region 1211 of the comparative seal imprint 121, shown in FIG. 5, is calculated while changing the positions of the reference seal imprint 110 and the comparative seal imprint 121 with respect to each other in the vertical direction A and the horizontal direction B in a step ST-131b to determine horizontal and vertical points at which the area of the overlap portion of the seal regions of the reference seal imprint 110 and the comparative seal imprint 121 becomes maximum. In addition, the area of an overlap portion of the seal region 111 of the reference seal imprint 110 and the seal region 1211 of the comparative seal imprint 121 is calculated while rotating the reference seal imprint 110 and the comparative seal imprint 121 with respect to each other in a step ST-131a to calculate the angle at which the area of the overlap portion becomes maximum. In this manner, the positions and angles of the reference seal imprint 110 and the comparative seal imprint 121 are matched with each other. The angles of the reference seal imprint 110 and the comparative seal imprint 121 may be matched with each other by deriving the centers of rotation of the reference seal imprint 110 and the comparative seal imprint 121 from the contours of the reference seal imprint 110 and the comparative seal imprint 121 and matching the centers of rotation centers of the reference seal imprint 110 and the comparative seal imprint 121 with each other. Although the step ST-131b is executed and then the step ST-131a is performed in the current embodiment of the present invention, the step ST-131a may be carried out before the step ST-131b. Otherwise, the steps ST-131a and ST-131b may be alternately repeated to find the vertical and horizontal points and angle at which the area of the overlap portion becomes maximum.

The above operation of finding the angle and horizontal and vertical points at which the area of the overlap portion becomes maximum is performed on the other comparative seal imprints 123, 125 and 127. To reduce a time required to find the angle and the horizontal and vertical points, it is possible to reduce the sizes of the reference seal imprint 110 and the comparative seal imprints 121, 123, 125 and 127 by ½ or ⅓, store the reduced seal imprints, detect the angle and horizontal and vertical positions at which the area of the overlap portion of the seal regions of the reduced reference seal imprint and each of reduced comparative seal imprints becomes maximum and apply the detected angle and horizontal and vertical points to the original reference seal imprint and comparative seal imprints.

Figure 9:
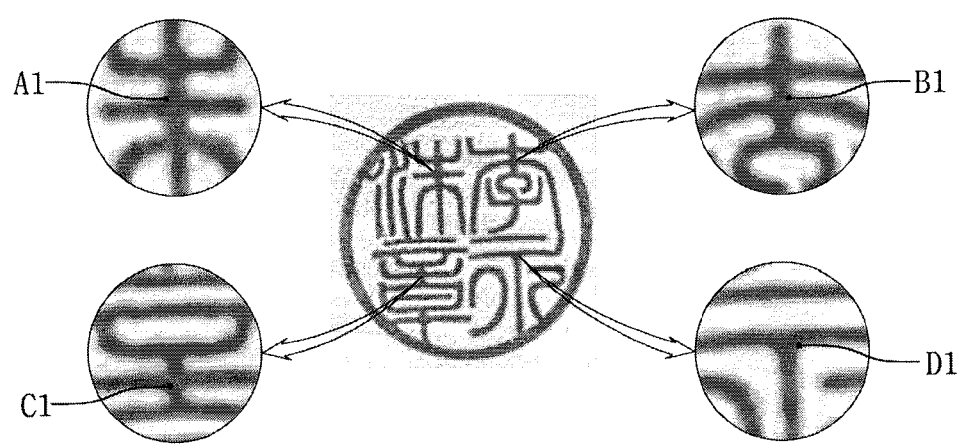
FIG. 9 illustrates an exemplary reference seal imprint for explaining the operation of matching the position and angle of the reference seal imprint with the position and angle of the comparative seal imprint according to another embodiment of the present invention.
Figure 10:
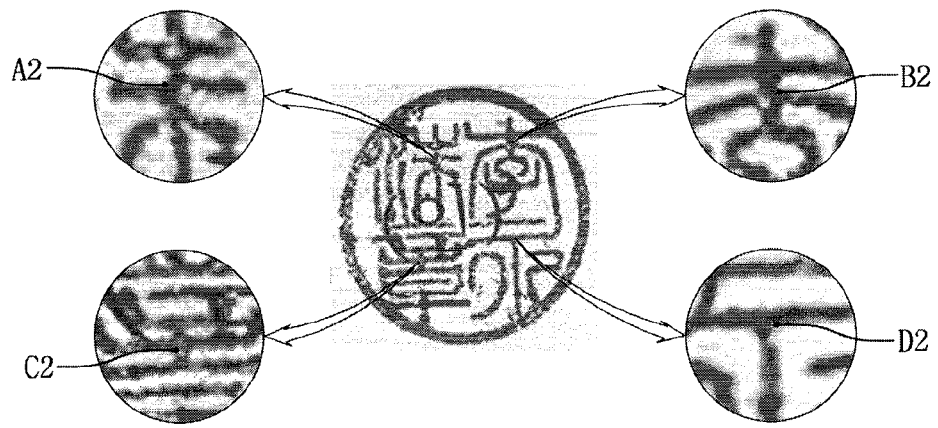
FIG. 10 illustrates an exemplary reference seal imprint for explaining the operation of matching the position and angle of the reference seal imprint with the position and angle of the comparative seal imprint according to another embodiment of the present invention.
Figure 11:
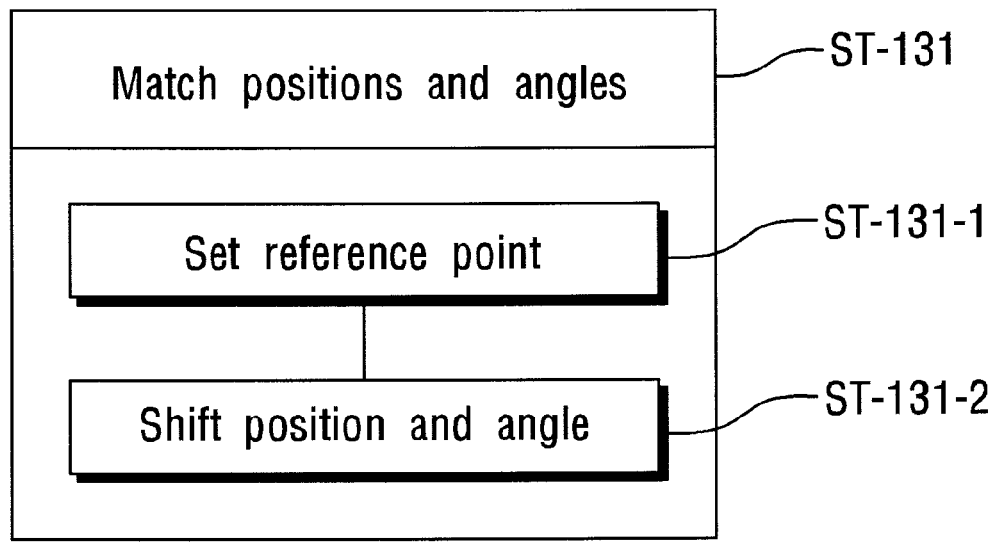
FIG. 11 illustrates an operation of matching the position and angle of the reference seal imprint with the position and angle of the comparative seal imprint according to another embodiment of the present invention.

FIGS. 9, 10 and 11 are views for explaining an alternative method of detecting the angle and horizontal and vertical positions at which the area of an overlap portion of the seal regions of the reference seal imprint and a comparative seal imprint according to an embodiment of the present invention.

Points (points at corners, for example) that can be reference points of the seal region of the reference seal imprint 110 are selected, as shown in FIG. 9, and reference points of the comparative seal imprint 123, which correspond to the reference points of the reference seal imprint 110, are selected, as shown FIG. 10, in a step ST-131-1.

If the coordinates of a reference point A1 in the reference seal imprint 110, shown in FIG. 9, are (x, y) and the coordinates of a reference point A2 in the comparative seal imprint 123, shown in FIG. 10, are (x', y'), the coordinates (x, y) and (x', y') have the following relationship.

$$x' = x_0 + \cos(\theta)x - \sin(\theta)y$$

$$y' = y_0 + \sin(\theta)x - \cos(\theta)y$$

Here, $x_0$ and $y_0$ represent horizontal and vertical position differences and $\theta$ represents rotational displacement. The aforementioned equations may be applied to the coordinates of other reference points (for example, B1, C1, D1, B2, C2 and D2) to calculate $x_0$, $y_0$ and $\theta$ according to the least square method, rotate the comparative seal imprint 123 at the same angle as that of the reference seal imprint 110 and control horizontal and vertical shifts of the comparative seal imprint 123.

Figure 12:
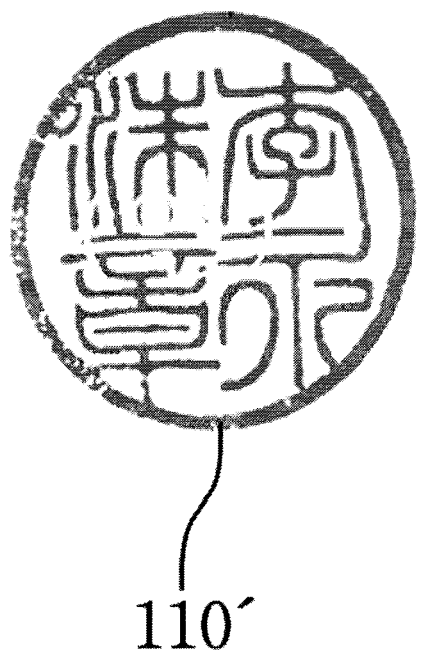
FIG. 12 illustrates a seal imprint obtained by deleting a portion of the reference seal imprint shown in FIG. 4, which corresponds to a portion "(의 )" of a comparative seal imprint.
Figure 13:
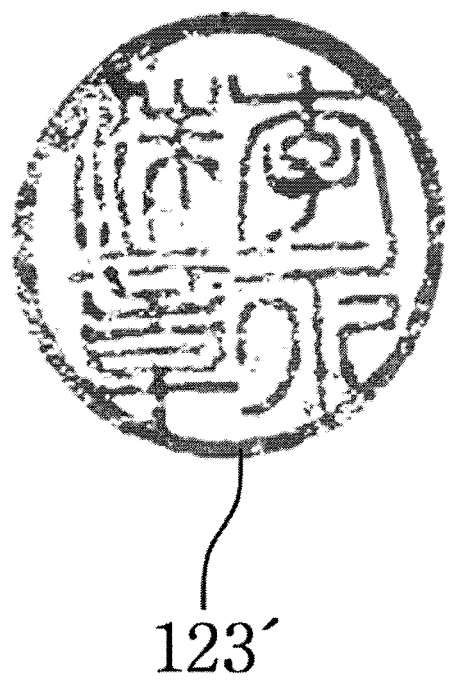
FIG. 13 illustrates a seal imprint obtained by deleting a portion "(의 )" of one of the comparative seal imprints shown in FIG. 5.

When a compared seal imprint includes a letter "(인)", for example, and a comparative seal imprint also includes "(인)", in order to correspond to the compared seal imprint, the portion corresponding to "(인)" is removed from the comparative seal imprint 123', as shown in FIG. 13. That is, the color of pixels corresponding to "(인)" is changed to the color of a blank portion 1213 of the comparative seal imprint, shown in FIG. 5. Furthermore, the color of pixels of a portion of the reference seal imprint, which corresponds to "(인)" of the comparative seal imprint, is changed to the color of the blank portion, as shown in FIG. 12. To facilitate this work, it is possible to apply the same threshold value to the reference seal imprint and the comparative seal imprint to binarize the reference seal imprint and the comparative seal imprint after or before the positions and angles of the reference seal imprint and the comparative seal imprint are controlled.

The portion "(인)" may be deleted by extracting a seal region imprinted by stamping ink. For example, when the seal imprint is formed using red stamping ink, a range capable of extracting only a red seal region is given to the seal imprint, and only pixels having R values of greater than 200, for example, are left and other pixels are changed to the color of the blank portion.

After the positions and angles of the reference seal imprint and the comparative seal imprint are controlled as described above, the color of the pixels corresponding to the letter "(인)" of the comparative seal imprint is changed to the color of the blank portion of the comparative seal imprint if the comparative seal imprint includes the letter "(인)" and the color of the pixels of the portion of the reference seal imprint, which correspond to "(인)" of the comparative seal imprint, is also changed to the color of the blank portion in ST-133, and characteristic values of the comparative seal imprint with respect to the reference seal imprint are calculated in step ST-135.

Figure 14:
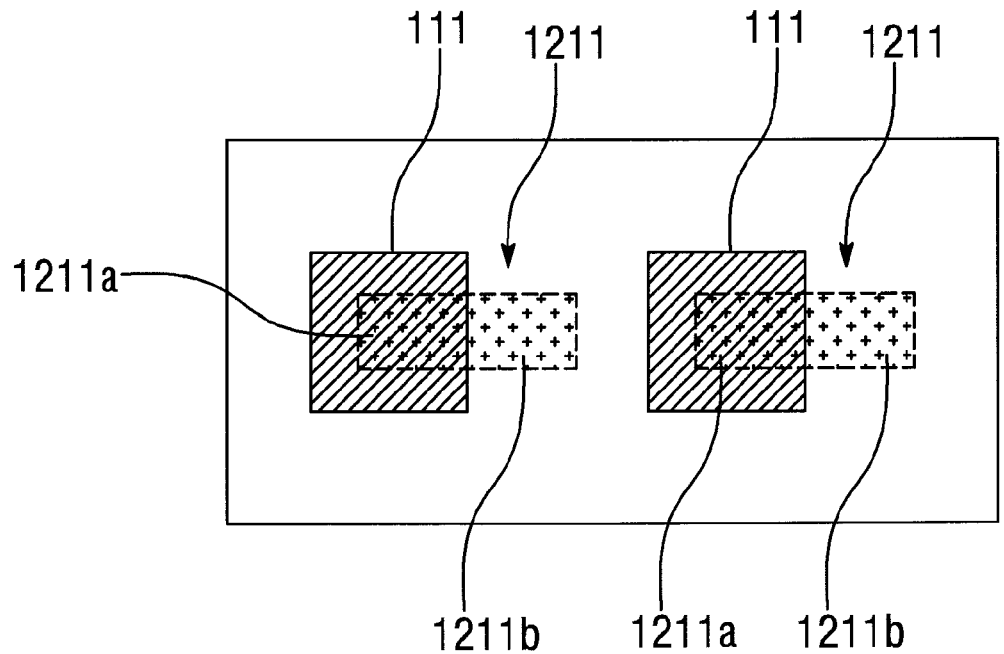
FIG. 14 is a schematic diagram for explaining an operation of calculating characteristic values of the reference seal imprint and a comparative seal imprint.

FIG. 14 is a view for explaining characteristic values and illustrates an overlapping state of the reference seal imprint 110 shown in FIG. 4 and the comparative seal imprint 121 shown in FIG. 5 after the positions and angles of the reference seal imprint 110 and the comparative seal imprint 121 are matched with each other. In FIG. 14, reference numeral 111 represents the seal region of the reference seal imprint 110, 1211a represents a first portion of the seal region 1211 of the comparative seal imprint 121, which belongs to the seal region 111 of the reference seal imprint 110, and 1211b represents a second portion of the seal region 1211 of the comparative seal imprint 121, which does not belong to the seal region of the reference seal imprint 110.

A packing rate ρ or an error rate ε of the comparative seal imprint with respect to the reference seal region is used as a characteristic value of the forged seal imprint inspection method. Both the packing rate ρ and the error rate ε may be used as characteristic values of the forged seal imprint inspection method.

The packing rate ρ and the error rate ε of the comparative seal imprint 121 are explained with reference to FIGS. 5 and 14.

The packing rate ρ of the comparative seal imprint 121 with respect to the reference seal imprint 110 is calculated according to Equation 1.

$$\rho = 1 - \frac{n(A) - (n(B) - n(B_{out}))}{n(A)}$$ [Equation 1]

Here, n(A) represents the area of the seal region of the reference seal imprint 110, n(B) represents the area of the seal region of the comparative seal imprint 121, and n($B_{out}$) represents the area of the second portion of the comparative seal imprint 121, which is not included in the seal region of the reference seal imprint.

The packing rate ρ calculated by Equation 1 is greater than 0 and smaller than 1. The sameness of the reference seal imprint and the comparative seal imprint decreases as the packing rate ρ becomes close to 0 and the sameness of the reference seal imprint and the comparative seal imprint increases as the packing rate ρ becomes close to 1. Although the reference seal imprint and the comparative seal imprint are generated using the same genuine seal, the packing rate ρ of the comparative seal imprint with respect to the reference seal imprint is smaller than 1 due to the state of stamping ink used to stamp the genuine seal. When n($B_{in}$) is the area of the first portion of the seal region 1211 of the comparative seal imprint 121, which belongs to the seal region 111 of the reference seal imprint 110, the packing rate ρ of the comparative seal imprint 121 may be calculated according to Equation 1 using n($B_{in}$) instead of n(B).

The error rate ε of the comparative seal imprint 121 is a value obtained by dividing the area of the second portion 1211b of the comparative seal imprint 121 by the area of the seal region 1211 of the comparative seal imprint 121 and multiplying 100 by the division result to be expressed as a percent. The error rate ε may be represented by Equation 2.

$$\varepsilon = \frac{n(B_{out})}{n(B)} \times 100$$ [Equation 2]

Here, n($B_{out}$) represents the area of the second portion 1211b of the comparative seal imprint 121 and n(B) represents the area of the seal region 1211 of the comparative seal imprint 121. When n($B_{in}$) is the area of the first portion of the seal region 1211 of the comparative seal imprint, which belongs to the seal region 111 of the reference seal imprint 110, the error rate ε of the comparative seal imprint 121 may be calculated using the area of the seal region 111 of the reference seal imprint 110, n(A), instead of n(B) or n($B_{in}$).

The sameness of the reference seal imprint 110 and the comparative seal imprint 121 becomes high as the error rate ε decreases and the sameness becomes low as the error rate ε increases.

Figure 15:
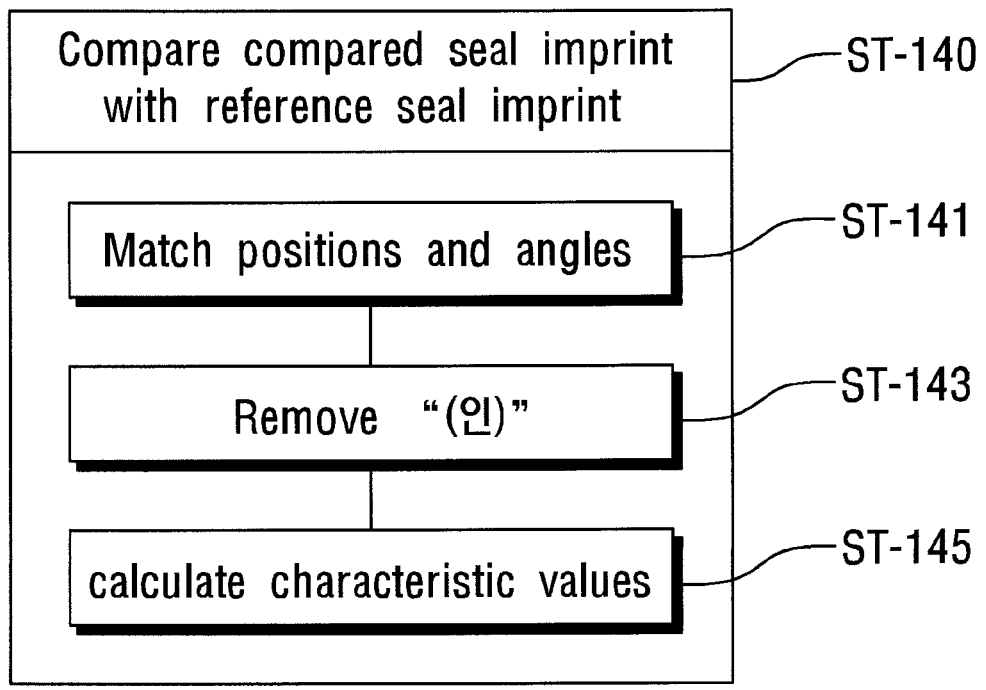
FIG. 15 illustrates an operation of comparing the reference seal imprint with a compared seal imprint.

The step ST-140 of calculating the characteristic value of a compared seal imprint with respect to the reference seal imprint includes a step ST-141 of matching the position and angle of the reference seal imprint with the position and angle of the compared seal imprint and a step ST-145 of calculating the characteristic value of the compared seal imprint with respect to the reference seal imprint, as shown in FIGS. 1 and 15.

Figure 7:
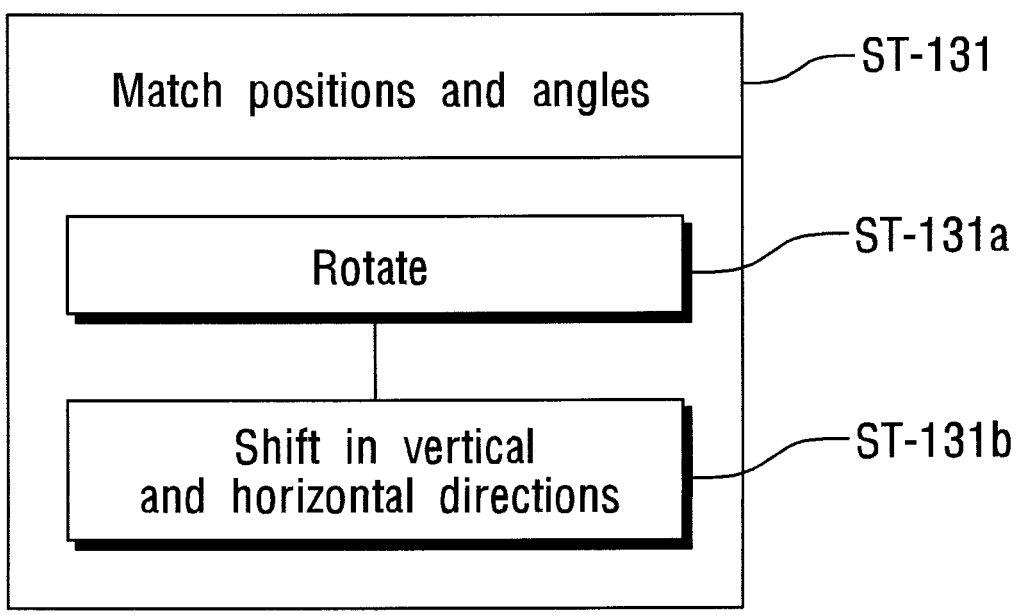
FIG. 7 illustrates an operation of matching the position and angle of the reference seal imprint with the position and angle of the comparative seal imprint according to an embodiment of the present invention.
Figure 16:
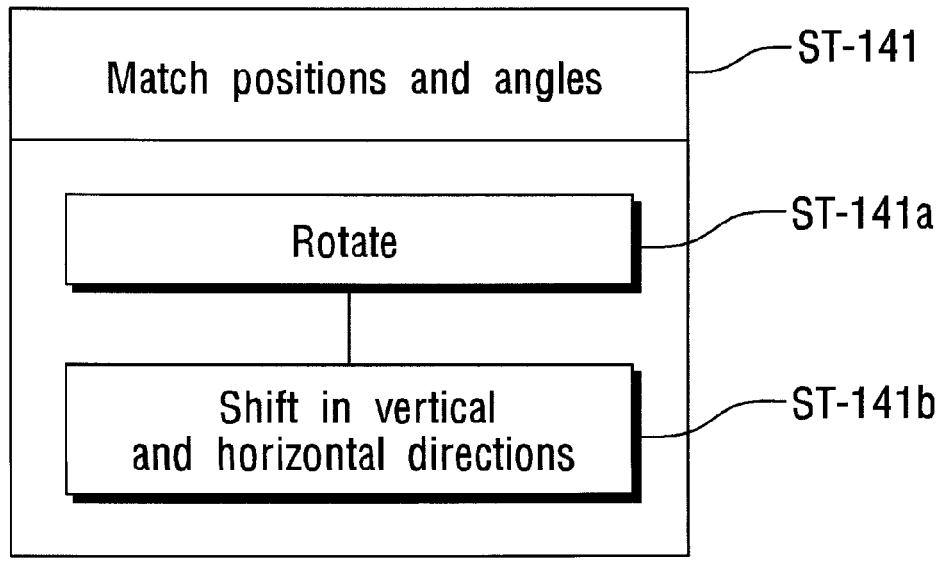
FIG. 16 illustrates an operation of matching the position and angle of the reference seal imprint with the position and angle of the compared seal imprint according to an embodiment of the present invention.
Figure 17:
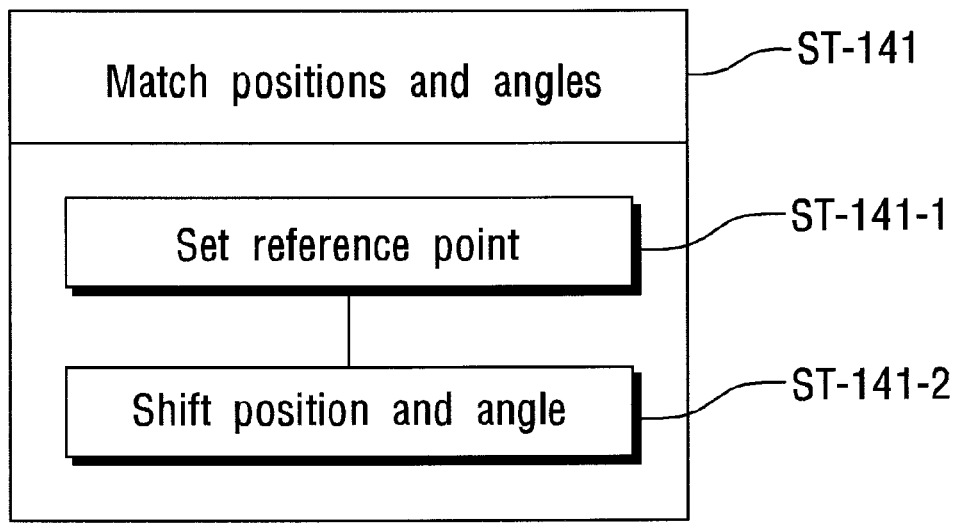
FIG. 17 illustrates an operation of matching the position and angle of the reference seal imprint with the position and angle of the compared seal imprint according to another embodiment of the present invention.

A method of matching the position and angle of the reference seal imprint with the position and angle of the compared seal imprint according to an embodiment of the present invention, shown in FIG. 16, includes a step ST-141a of rotating the reference seal imprint and the compared seal imprint with respect to each other, as shown in FIGS. 7 and 8, and a step ST-141b of shifting the reference seal imprint and the compared seal imprint in the vertical and horizontal directions. A method of matching the position and angle of the reference seal imprint with the position and angle of the compared seal imprint according to another embodiment of the present invention, shown in FIG. 17, includes a step ST-141-1 of setting reference points in the reference seal imprint and the compared seal imprint, as shown in FIGS. 9, 10 and 11, and a step ST-141-2 of shifting the positions and angles of the reference seal imprint and the compared seal imprint using the reference points. In the method shown in FIG. 16, it is possible to shifting the reference seal imprint and the compared seal imprint in the vertical and horizontal directions in the step ST-141b to obtain vertical and horizontal positions in which the area of an overlap portion of the seal regions of the reference seal imprint and the compared seal imprint becomes maximum and rotate the reference seal imprint and the compared seal imprint with respect to each other in the vertical and horizontal positions in step ST-141a to obtain an angle at which the area of the overlap portion becomes maximum.

The operation of matching the position and angle of the reference seal imprint with the position and angle of the compared seal imprint corresponds to the operation of matching the position and angle of the reference seal imprint with the position and angle of the comparative seal imprint so that detailed explanation thereof is omitted.

After the positions and angles of the reference seal imprint and the compared seal imprint are matched with each other, if the compared seal imprint includes a letter "(인)", the reference seal imprint and the compared seal imprint are binarized, the color of pixels corresponding to "(인)" of the compared seal imprint is changed to the color of a blank region of the compared seal imprint, and the color of pixels of the reference seal imprint, which corresponds to "(인)" of the compared seal imprint, is also changed to the color of the blank region in step ST-143. Here, the present invention is not limited to the binarization and the letter "(인)" of the compared seal imprint may be removed without using binarization.

After the steps ST-141 and ST-143, the characteristic value of the compared seal imprint with respect to the reference seal imprint is calculated in a step ST-145.

The packing rate ρ or the error rate ε of the compared seal imprint with respect to the reference seal imprint is used as the characteristic value. Otherwise, both the packing rate ρ and the error rate ε of the compared seal imprint may be used as characteristic values of the compared seal imprint.

The packing rate ρ and the error rate ε of the compared seal imprint is explained with reference to FIG. 14.

The packing rate ρ of the compared seal imprint with respect to the reference seal imprint is calculated by Equation 3.

$$\rho = 1 - \frac{n(A) - (n(B) - n(B_{out}))}{n(A)} \quad \text{[Equation 3]}$$

Here, n(A) represents the area of the seal region of the reference seal imprint, n(B) represents the area of the seal region of the compared seal imprint, and $n(B_{out})$ denotes the area of a second portion of the seal region of the compared seal imprint, which does not belong to the seal region of the reference seal imprint.

The calculated packing rate ρ is greater than 0 and smaller than 1. The sameness of the reference seal imprint and the compared seal imprint is low when the calculated packing rate ρ is close to 0 and the sameness is high when the calculated packing rate ρ is close to 1. When $n(B_{in})$ is the area of a first section of the seal region of the compared seal imprint, which belongs to the seal region of the reference seal imprint, the packing rate ρ of the compared seal imprint is calculated using $n(B_{in})$ instead of n(B).

The error rate ε of the compared seal imprint is a value obtained by dividing the area of the second section of the compared seal imprint by the area of the seal region of the compared seal imprint and multiplying 100 by the division result to be expressed by a percent. That is, the error rate ε is calculated by Equation 2. The sameness of the reference seal imprint and the compared seal imprint becomes high as the error rate ε decreases and the sameness becomes low as the error rate ε increases. The first portion $n(B_{in})$ of the compared seal imprint represents a portion of the seal region of the compared seal imprint, which belongs to the seal region of the reference seal imprint, and the second portion of the compared seal imprint represents a portion of the seal region of the compared seal imprint, which does not belong to the seal region of the reference seal imprint. When the packing rate of the compared seal imprint is calculated using the area of the first portion of the comparative seal imprint (or using the area of the seal region of the reference seal imprint), the error rate ε of the compared seal imprint is calculated using $n(B_{in})$ (or n(A)) instead of n(B).

The characteristic value of the comparative seal imprint with respect to the reference seal imprint is compared with the characteristic value of the compared seal region with respect to the reference seal imprint in a step ST-150 to provide objective data used to determine whether the compared seal imprint is forged.

Figure 18:
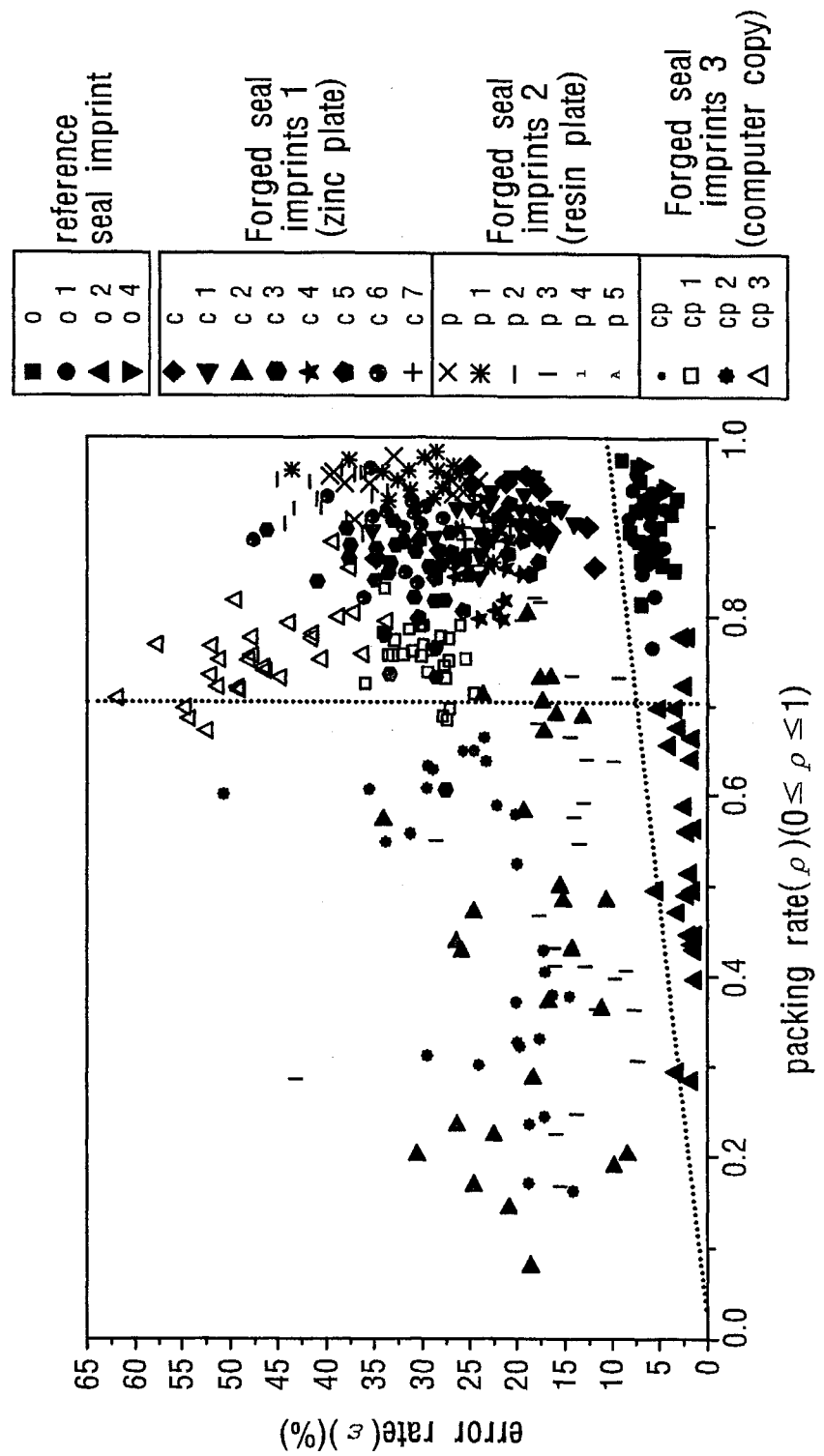
FIG. 18 is a graph showing characteristic values of comparative seal imprints and a compared seal imprint with respect to the reference seal imprint.

FIG. 18 is a graph showing results of experiments of generating reference seal imprints and comparative seal imprints from a genuine seal and comparing the comparative seal imprints with compared seal imprints stamped by seals forged through zinc plate etching, resin plate etching and computer copy.

As shown in FIG. 18, four reference seal imprints were generated, eight forged seals were manufactured using zinc plate etching and a first compared seal imprint group (first forged seal imprint group) was generated by stamping the eight forged seals. Furthermore, six forged seals were manufactured using resin plate etching and a second compared seal imprint group (second forged seal imprint group) was generated by stamping the six forged seals. In addition, four forged seals were manufactured through computer copy and a third compared seal imprint group (third forged seal imprint group) was generated by stamping the four forged seals.

The characteristic values of the comparative seal imprints with respect to the reference seal imprints were calculated according to the above method, the characteristic values of the compared seal imprints with respect to the reference seal imprints were calculated according to the above method, and the calculated characteristic values were shown on the graph having the vertical axis representing the error rate ε and the horizontal axis representing the packing rate ρ.

As shown in FIG. 18, the packing rates ρ of the compared seal imprints with respect to the reference seal imprints were distributed in the range of 0.28 to 0.98 according to stamping conditions such as the state and quantity of stamping ink, the error rates ε were smaller than 10% irrespective of the stamping conditions, and the error rate ε decreased as the packing rate ρ decreased. When a straight line is extended from a point corresponding to a packing rate of 0 and an error rate of 0% to a point corresponding to a packing rate of 1 and an error rate of higher than 0%, a reference line for determining whether a compared seal imprint is forged was generated. More specifically, when a straight line was extended from the point at which the packing rate ρ is 0 and the error rate ε is 0% to the point at which the packing rate ρ is 1 and the error rate ε is 10% to draw a reference line 200, it was confirmed that the reference line 200 can be used as an objective basis for determining whether a compared seal imprint is forged by checking whether the packing rate ρ and the error rate ε of the compared seal imprint are located above the reference line 200 or below the reference line 200.

Since the error rate ε decreases as the packing rate ρ decreases, the error rate ε may be corrected using the packing rate ρ as represented by Equation 6. If the characteristic values are shown on the graph having the horizontal axis representing the error rate $\epsilon_1$ corrected by Equation 6, the reference line 200 may be parallel with the horizontal axis representing the corrected error rate $\epsilon_1$.

When the reference line 200 is set on the graph having the horizontal axis representing the error rate ε and the vertical axis representing the packing rate ρ, a compared seal imprint may be determined to be a genuine seal imprint when the characteristic value of the compared seal imprint is located on the left of the reference line 200 and determined to be a forged seal imprint when the characteristic value is located on the right of the reference line 200.

Figure 19:
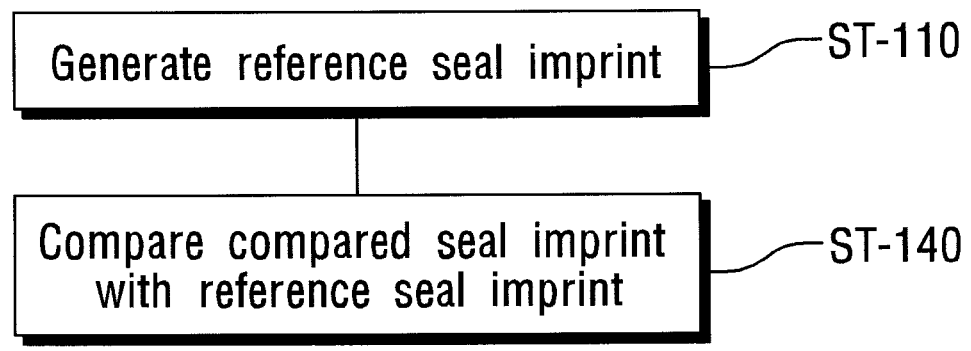
FIG. 19 illustrates a forged seal imprint inspection method according to another embodiment of the present invention.

As shown FIG. 19, a forged seal imprint may be inspected only by comparing a compared seal imprint with the reference seal imprint without comparing a comparative seal imprint with the reference seal imprint.

As described above, when the genuine seal is stamped multiple times to generate the reference seal imprint in the step ST-110 and the error rate ε and the packing rate ρ of the compared seal imprint are calculated and shown on the graph as shown in FIG. 18, it is possible to confirm whether the compared seal imprint is forged. Furthermore, even when the error rate ε and the packing rate ρ of the compared seal imprint are shown on the graph having the vertical axis representing the packing rate ρ and the horizontal axis representing the error rate ε, it is possible to confirm whether the compared seal imprint is forged.

In the operation of comparing the compared seal imprint with the reference seal imprint, the step of matching the position and angle of the compared seal imprint with the position and angle of the reference seal imprint, the step of changing the color of the portion "(의 )" of the compared seal imprint to the color of the the blank portion of the compared seal imprint when the compared seal imprint includes the portion "(의 )" and changing the color of a portion of the reference seal imprint, which corresponds to the portion "(의 )" of the compared seal imprint, and the step of calculating the error rate ε and/or the packing rate ρ of the compared seal imprint with respect to the reference seal imprint correspond to the aforementioned steps of the operation of comparing the comparative seal imprint with the reference seal imprint so that explanations thereof are omitted.

A forged seal imprint inspection method according to another embodiment of the present invention will now be explained.

Figure 20:
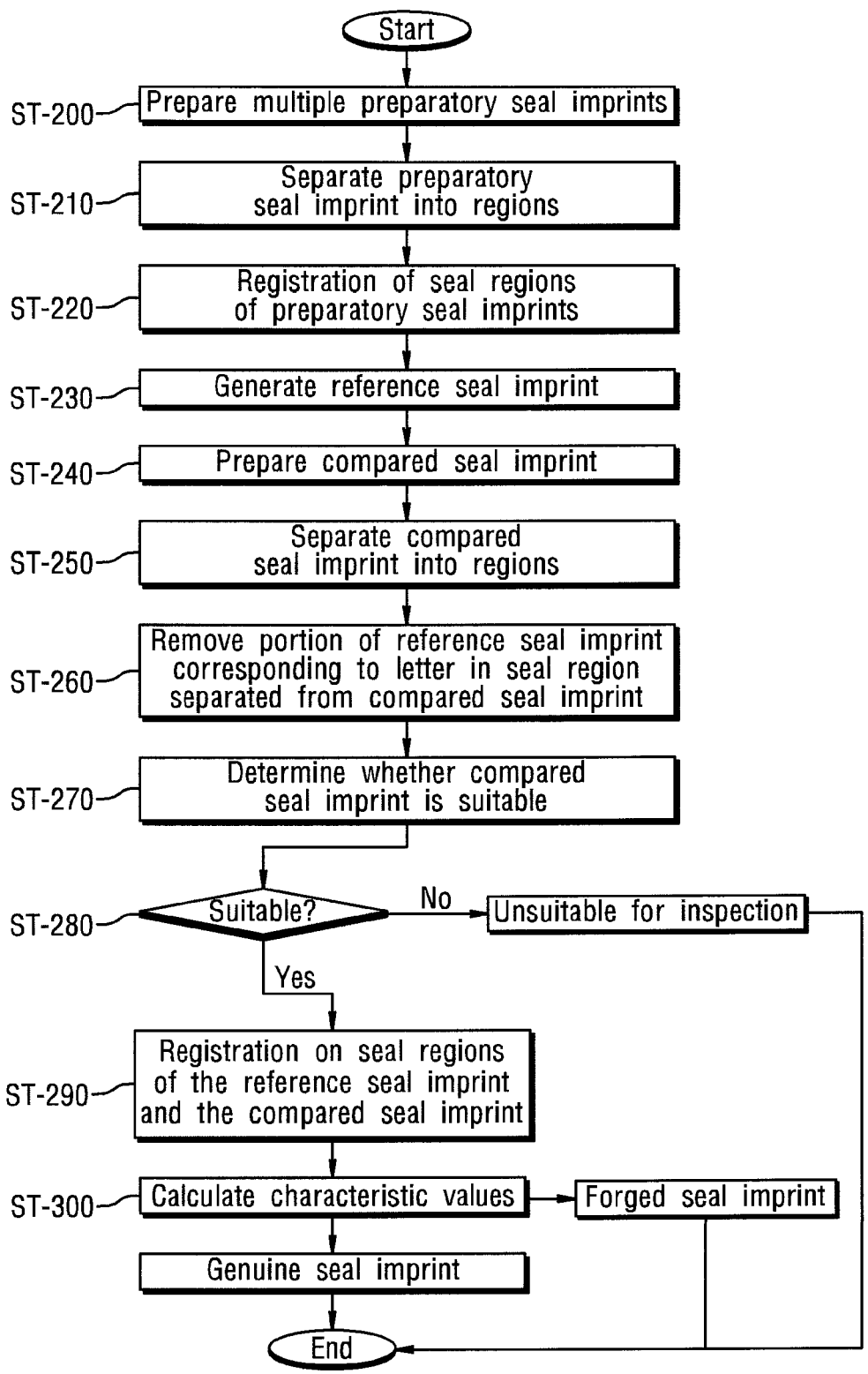
FIG. 20 is a flowchart showing a forged seal imprint inspection method according to another embodiment of the present invention.

FIG. 20 is a flowchart showing the forged seal imprint inspection method according to another embodiment of the present invention.

Referring to FIG. 20, the forged seal imprint inspection method includes a step ST-200 of generating at least one preparatory seal imprint, preferably, more than two preparatory seal imprints, from a genuine seal, a step ST-210 of separating each preparatory seal imprint into regions, a step ST-230 of performing registration on seal regions of the preparatory seal imprints to generate a reference seal imprint, a step ST-240 of separating a seal imprint to be inspected into regions to generate a compared seal imprint, a step ST290 of matching a seal region of the reference seal imprint with a seal region of the compared seal imprint, and a step ST-300 of calculating characteristic values of the reference seal imprint and the compared seal imprint through the matching step.

The forged seal imprint inspection method according to another embodiment of the present invention shown in FIG. 20 uses the error rate ε that represents a degree of difference between the reference seal imprint and the compared seal imprint and the packing rate ρ that represents the intensity of stamped ink of the compared seal imprint or the intensity of seal and reflects the packing rate ρ in the error rate ε to determine inspect whether the compared seal imprint is forged so as to improve the determination accuracy.

Specifically, at least one preparatory seal imprint, preferably, a plurality of preparatory seal imprints 110a, 110b and 110c shown in FIG. 3, are generated from the genuine seal in the step ST-200. That is, the genuine seal may be stamped on blank paper multiple times and the seal imprints are scanned or photographed to generate the plural preparatory seal imprints. Each preparatory seal imprint is separated into regions in the step ST-210. Specifically, the preparatory seal imprint is separated into a seal region, a letter region and a background region. The preparatory seal imprint may be separated into the seal region and the background region because the preparatory seal imprint may be generated by stamping the genuine seal on blank paper and thus the preparatory seal imprint does not include a letter region. The compared seal imprint to be inspected may be formed on paper on which letters are written, and thus the compared seal imprint is separated into the seal region, the letter region and the background region. Of course, the compared seal imprint may not include the letter region when the compared seal imprint is formed on blank paper.

Figure 21:
FIG. 21 is a view for explaining an operation of separating a region of a compared seal imprint or a reference seal imprint.

FIG. 21 is a view for explaining the step of separating the compared seal imprint or the reference seal imprint. Though FIG. 21 shows the step of separating the compared seal imprint, the preparatory seal imprint can be separated through the same operation. In the current embodiment of the present invention, the seal region is separated as a red component and the letter region is separated as a green component based on the fact that stamping ink is red (blue in the case of stamping ink for stamps) for the purpose of separating the reference seal imprint and the compared seal imprint.

When the red seal region is separated, a threshold value is determined through Otus algorithm (method using between-class covariance) using a statistical method of global histogram. The Otus algorithm sets a middle value in two histograms when it is difficult to set a threshold value for some numerical values so as to determine the threshold value relatively accurately. The Otus algorithm is known so that detailed explanation thereof is omitted. After the red seal region is separated, the threshold value is applied to separate the background region and the letter region from the histogram from which the seal region has been separated.

More specifically, the seal region of the input image (compared seal imprint) corresponding to the left image of FIG. 21 may have an intensity difference greater than that of the background region or the letter region because the seal region may be in red (or blue). Here, a reference point (point having a large distribution difference) is set in brightness histogram and values greater than the reference point are set as the seal region. Since the seal region is in red (or blue), a red intensity value of pixels corresponding to the seal region is large and a green intensity value of the pixels is small. Pixels corresponding to the background region are generally in white, and thus the red and green intensity values of the pixels corresponding to the background region are close to 0. Accordingly, pixels having red and green intensity values higher than a predetermined value are processed as red (seal region) to separate only the seal region. In this manner, the letter region is also separated. Although the seal region, the background region and the letter region are separated using an intensity difference between red and green components in the current embodiment of the present invention, it is possible to apply different color components to separate the respective regions of the compared seal imprint through the aforementioned operation in the case of stamping ink in colors other than red. In the present invention, only the seal region can be separated with stability for various paper sheets and stamping ink using a difference between the red and green components.

Next, registration is performed on only the seal regions of the preparatory compared imprints, separated in the step ST-210, in step ST-220 to generate a reference seal imprint in step ST-230. Specifically, rotating angles and displacements of the preparatory seal imprints are adjusted to find a point at which the area of an overlap portion of the seal regions of the preparatory seal imprints becomes maximum and the average of pixels corresponding to the point is calculated so as to generate a reference seal imprint. More specifically, two preparatory seal imprints from which seal regions have been separated are superimposed, one of the preparatory seal imprint is fixed, the other is shifted in horizontal and vertical directions to find a point at which the area of an overlap portion of the seal regions of the two preparatory seal imprints becomes maximum, and the other preparatory seal imprint is rotated while the one preparatory seal imprint is fixed to the point to find a point at which the area of an overlap portion of the seal regions of the two preparatory seal imprints becomes maximum. The average of pixels of the two preparatory seal imprints at the point is calculated and a reference seal imprint composed of pixels having the average is generated. When a distinct seal imprint that was judged to be a seal imprint having uniform stamping ink adhering thereto was selected as a preparatory seal imprint and an error was calculated, the error was considerably large because the intensity of stamping ink was not uniform even in this preparatory seal imprint. Accordingly, when seal imprints are averaged, the error can be removed and a suitable reference seal imprint can be generated.

As described above, the plural preparatory seal imprints are averaged to generate the reference seal imprint. FIG. 4 illustrates the reference seal imprint generated from the preparatory seal imprints shown in FIG. 3. This reference seal imprint is compared with a compared seal imprint to inspect whether the compared seal imprint is forged through the above-described operation.

In step ST-240, a seal imprint on a document, which will be inspected, is scanned or photographed to generate a compared seal imprint. The compared seal imprint is separated into regions, as described above. Since a seal imprint on a document is generally provided as a compared seal imprint, the compared seal imprint may include a seal region, a letter region and a background region. The step ST-250 of separating the compared seal imprint has been explained above with reference to FIG. 21 so that detailed explanation thereof is omitted.

When the compared seal imprint includes the letter region, a portion of the reference seal imprint, which corresponds to the letter region of the compared seal imprint, is removed to cancel an error in a step ST-260. The portion of the reference seal imprint, which corresponds to the letter region of the compared seal imprint, is removed through the same operation as the aforementioned region separating operation.

If it is inspected whether the compared seal imprint is forged only using the error rate obtained when registration is performed on the reference seal imprint and the compared seal imprint, an error may be generated. This is because seal conditions such as seal intensity and the concentration of stamping ink adhering to a seal and whether the seal imprint is formed on a letter are not considered. Accordingly, the present invention extracts a letter portion superimposed on a seal portion from the compared seal imprint and removes the letter portion to generate a reference seal imprint in the step of separating the compared seal region into regions to thereby eliminate the influence of the letter.

Figure 22:
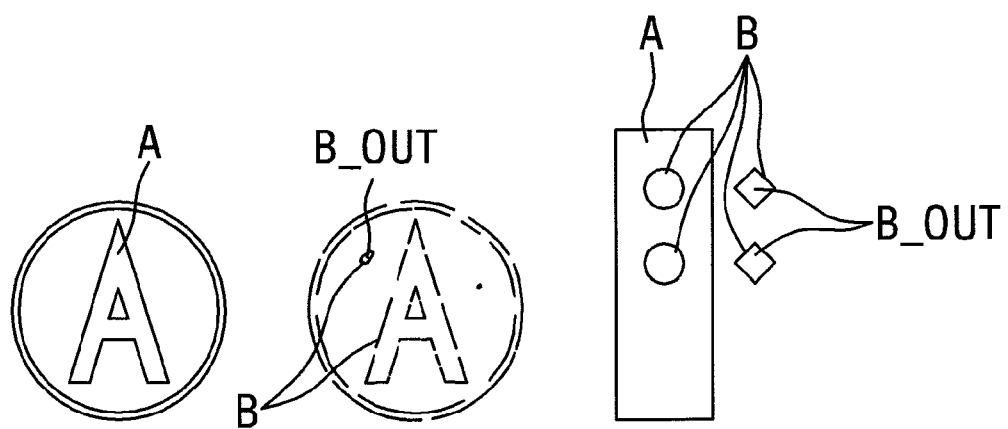
FIG. 22 illustrates seal regions of the reference seal imprint and the compared seal imprint.

Finally, registration is executed on the reference seal imprint and the compared seal imprint and characteristic values are calculated. FIG. 22 is a schematic diagram showing seal regions of the reference seal imprint and the compared seal imprint. Registration of the seal regions of the reference seal imprint and the compared seal imprint can be performed as described above. However, the registration may be executed by obtaining shift and rotation parameters as follows.

Referring to FIG. 22, while the reference seal imprint A is completely packed because the reference seal imprint is an averaged seal imprint, the compared seal imprint B has an unpacked portion and a portion B_out which has stamping ink excessively adhering thereto and is located outside the seal imprint.

$$A = a_{(x,y)} Ca_{(x,y)} \in \text{Reference seal imprint } B, a_{(x,y)} = 1$$

$$B = b_{(x,y)} Cb_{(x,y)} \in \text{Compared seal imprint}, b_{(x,y)} = 1$$

$$B_{\_out} = b_{\_out(x,y)} Cb_{\_out(x,y)} \in B, a_{(x,y)} \neq 1 \qquad \text{[Equation 4]}$$

Optimized registration between the reference seal imprint A and the compared seal imprint B can be achieved by obtaining shift and rotation parameters by which a matching pixel count (MPC) becomes a maximum value according to Equation 5.

$$(G\theta, Gx, Gy) = \text{Argmax}(MPC) \qquad \text{[Equation 5]}$$

$$MPC = QT(x, y)T(x, y) = \begin{cases} 1, & \text{if } a_{(x,y)} = 1, b_{(x,y)} = 1 \\ 0, & \text{otherwise} \end{cases}$$

In the current embodiment of the present invention, the shift and rotation parameters are obtained while rotating the reference seal imprint and the compared seal imprint by 0.25° and shifting the reference seal imprint and the compared seal imprint by one pixel on X and Y axes.

Characteristic values are calculated through the optimized registration between the reference seal imprint and the compared seal imprint according to Equation 5 so as to inspect whether the compared seal imprint is forged in a step ST-300. Here, the characteristic values include the error rate $\epsilon$ representing a difference between the reference seal imprint and the compared seal imprint and the packing rate $\rho$ representing seal intensity.

Figure 25:
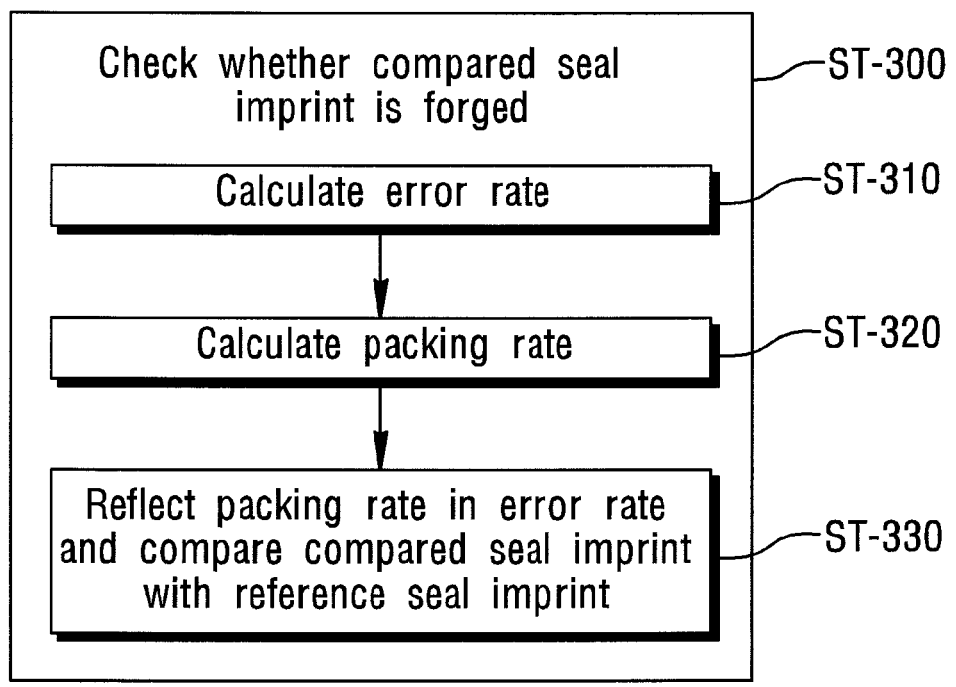
FIG. 25 is a flowchart showing an operation of whether a compared seal imprint is forged in the forged seal imprint inspection method according to the present invention.

Referring to FIG. 25, an operation of calculating the characteristic values may includes a step ST-310 of calculating the error rate, a step ST-320 of calculating the packing rate, and a step ST-330 of reflecting the packing rate in the error rate and comparing the compared seal imprint with the reference seal imprint.

Figure 23:
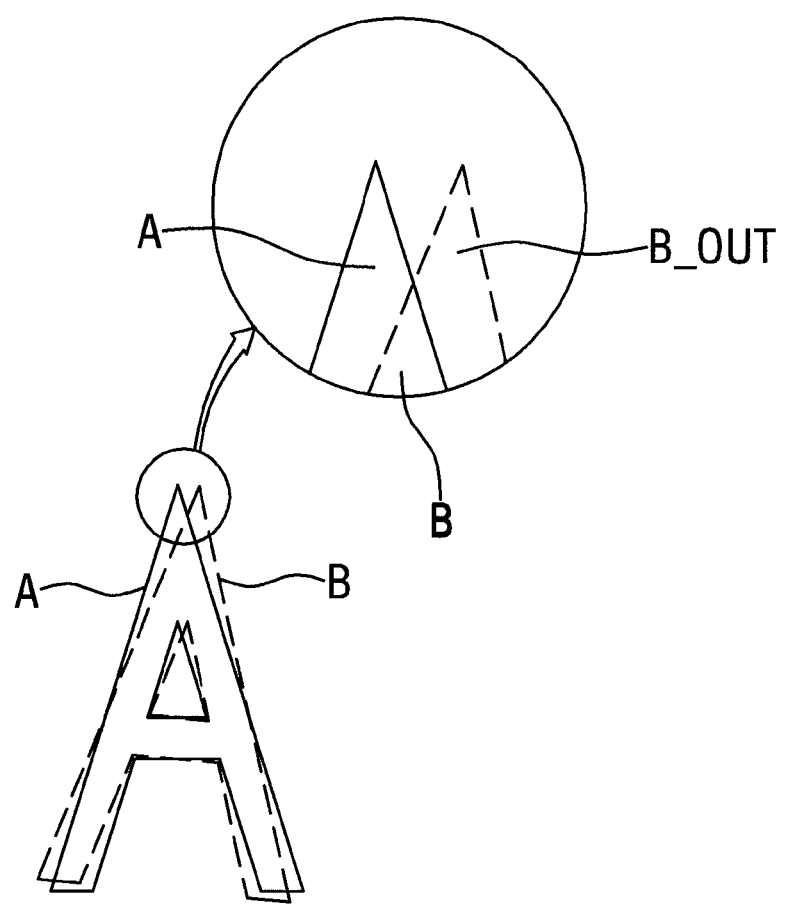
FIG. 23 illustrates a registration state of the reference seal imprint and the compared seal imprint.

As described above, the error rate is a ratio of the area B_out of a portion of the seal region of the compared seal imprint, which is not included in the seal region of the reference seal imprint, to the area n(B) of the seal region of the compared seal imprint and the area n(A) of the seal region of the reference seal imprint and may be represented by Equation 2. FIG. 23 shows a seal imprint "A". In FIG. 23, A represents the area of a seal region of a reference seal imprint, B represents the area of a seal region of a compared seal imprint, and B_out represents the area of a portion of the seal region of the compared seal imprint, which is out of the reference seal imprint. In Equation 2, $n(B_{out})$ corresponds to the area of a second portion of the compared seal imprint. The error rate of the compared seal imprint may be calculated by substituting n(B) with n(A) or $n(B_{in})$ (here, n(A) is the area of the seal region of the reference seal imprint and $n(B_{in})$ is the area of a portion of the seal region of the compared seal imprint, which belongs to the seal region of the reference seal imprint).

In addition, the packing rate is calculated and the error rate in which the packing rate is reflected is used to inspect the compared seal imprint is forged so as to correct the error rate varied with seals. The packing rate is a factor for determining whether the compared seal imprint is packed and is represented by Equation 3. In Equation 3, n(A) is the area of the seal region of the reference seal imprint, n(B) is the area of the seal region of the compared seal imprint, and $n(B_{out})$ is the area of a portion of the seal region of the compared seal imprint, which does not belong to the seal region of the reference seal imprint. The packing rate of the compared seal imprint may be calculated by substituting n(B) with n(A) or $n(B_{in})$ (here, $n(B_{in})$ is the area of a portion of the seal region of the compared seal imprint, which belongs to the seal region of the reference seal imprint).

The error rate may be corrected by reflecting the packing rate in the error rate, as represented by Equation 6.

$$\varepsilon_1 = \frac{\varepsilon}{\rho} \quad \text{[Equation 6]}$$

The sameness of the compared seal imprint and the reference seal imprint becomes high as the corrected error rate $\varepsilon_1$ decreases and the sameness becomes low as the corrected error rate $\varepsilon_1$ increases. In other words, the sameness of the compared seal imprint and the reference seal imprint is low when the packing rate is close to 0 and the sameness is high when the packing rate is close to 1.

Figure 24:
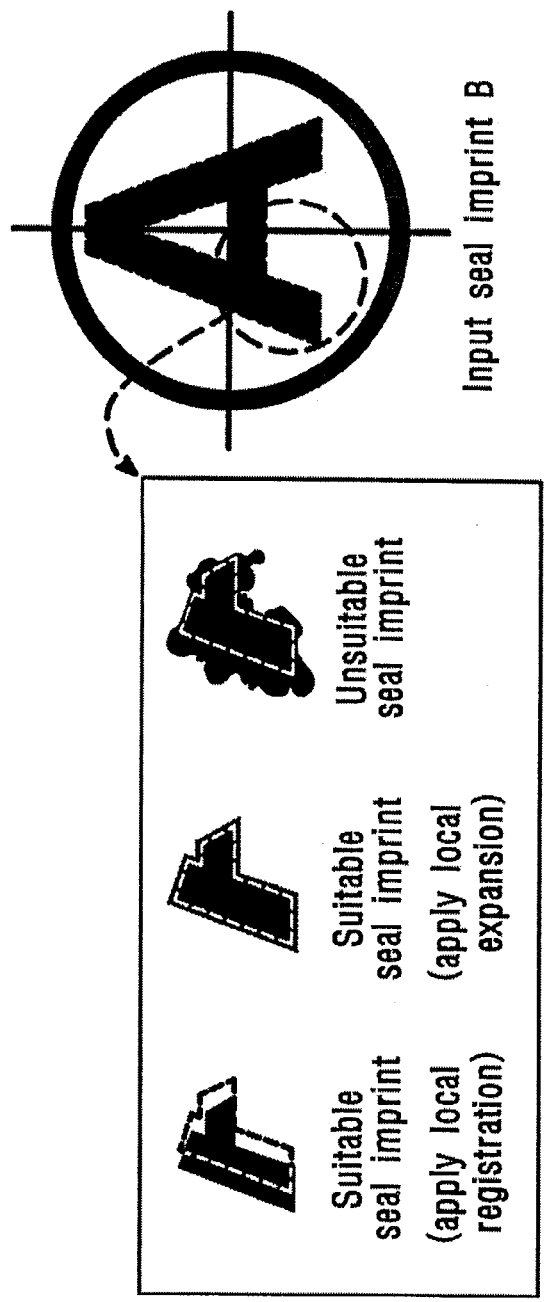
FIG. 24 illustrates examples of suitable seal imprints and an unsuitable seal imprint.

FIG. 24 illustrates examples of suitable seal imprints and an unsuitable seal imprint. Before registration between the reference seal imprint and the compared seal imprint is performed to inspect whether the compared seal imprint is forged, it is detected whether the compared seal imprint is suitable for the inspection in the step ST-270 shown in FIG. 20. An unsuitable seal imprint corresponds to a seal imprint with excessive stamping ink adhering thereto. If it is determined that the compared seal imprint is unsuitable in step ST-280, the inspection operation is not performed.

A method of checking whether the compared seal imprint is unsuitable is explained. The packing rate of the compared seal imprint is low if insufficient stamping ink adheres to the compared seal imprint and the number of portions B_out increases if stamping ink excessively adheres to the compared seal imprint when the input seal imprint is generated using the genuine seal. In the case of a forged seal imprint, the number of portions B_out may increase due to an error, and thus it is required to determine whether the portion B_out is caused by forgery or excessive stamping ink.

Accordingly, the present invention determines whether B_out is caused by forgery or excessive stamping ink based on the fact that B_out of a forged seal imprint maintains the stroke of the forged seal imprint to some degree while B_out caused by excessive stamping ink has a certain shape. Since the registration step ST-290 is globally performed, perspective distortion of a seal imprint according to photographing during an seal imprint acquisition operation may be generated or a seal imprint having a partially matched portion, such as a copied or CAM forged seal imprint, may be generated. In this case, when registration is locally performed on the largest portion B_out, the number of portions B_out is decreased. Furthermore, when the size of the reference seal imprint is magnified by specific pixels for the largest portion B_out using dilation among morphology techniques, the number of portions B_out due to forgery is considerably reduced. Accordingly, if the number of portions B_out is not largely decreased after local magnification and registration, it is determined that B_out is caused by excessive stamping ink.

Accordingly, if the compared seal imprint is determined to be unsuitable in the step ST-280, forgery inspection is impossible, and thus it can be determined whether excessive stamping ink adhesion is caused by forgery through local magnification and registration.

Figure 26:
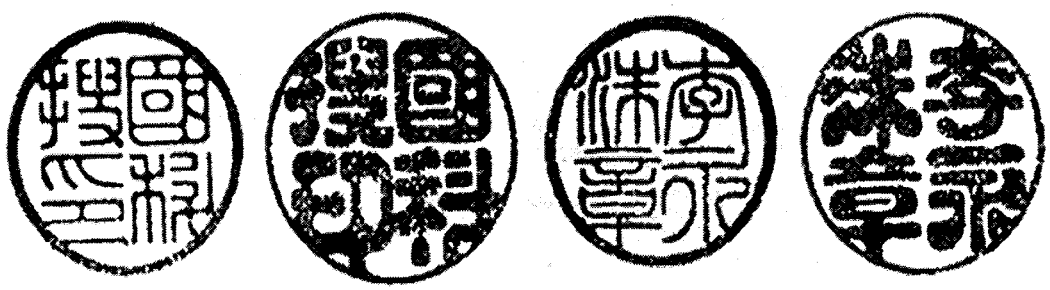
FIG. 26 illustrates four genuine seal imprints used for experiments.

FIG. 26 illustrates four genuine seals used for experiments and FIGS. 27 through 35 are graphs showing experimental results obtained by generating preparatory seal imprints and a reference seal imprint from the genuine seals and comparing seal imprints generated using seals forged through zinc plate etching, resin plate etching and computer copy with the reference seal imprint. In FIGS. 27 through 31, "■" represents a scatter plot of the packing rates and the error rates of the preparatory seal imprints, generated by stamping the genuine seal multiple times, with respect to the reference seal imprint generated from the preparatory seal imprints, "●" represents a scatter plot of the packing rate and error rate of a compared seal imprint, generated by stamping a seal forged by zinc plate etching, with respect to the reference seal imprint, "▲" represents a scatter plot of the packing rate and error rate of a compared seal imprint, generated by stamping a seal forged by resin plate etching, with respect to the reference seal imprint, and "▼" represents a scatter plot of the packing rate and error rate of a compared seal imprint, generated by stamping a seal forged by computer copy, with respect to the reference seal imprint.

Figure 27:
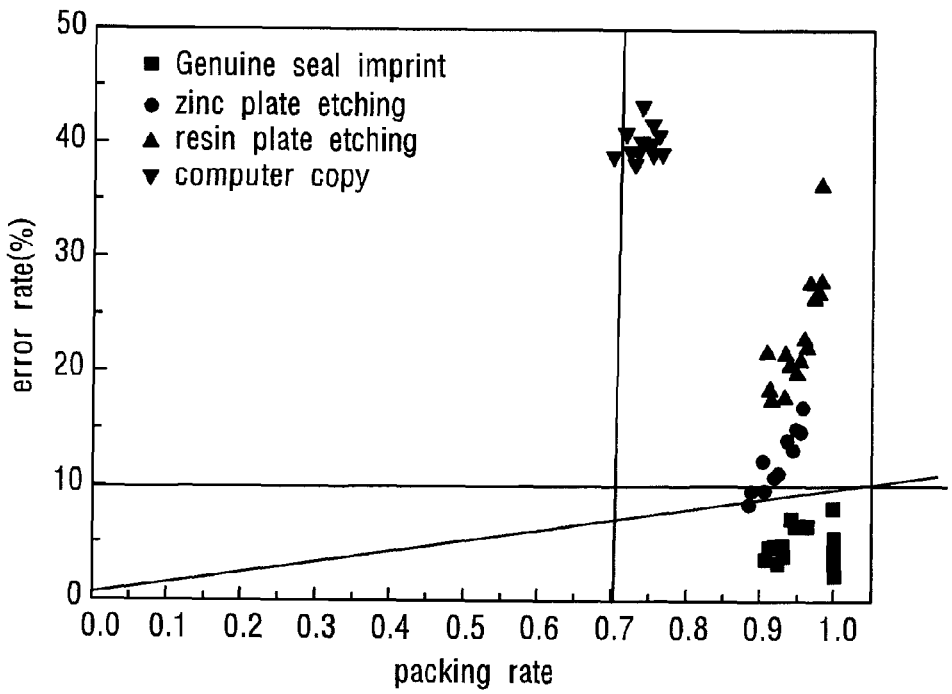
FIGS. 27, 28 and 29 are scatter plots of packing rates and error rates of the four genuine seal imprints shown in FIG. 26 and forged seal imprints (compared seal imprints)
Figure 28:
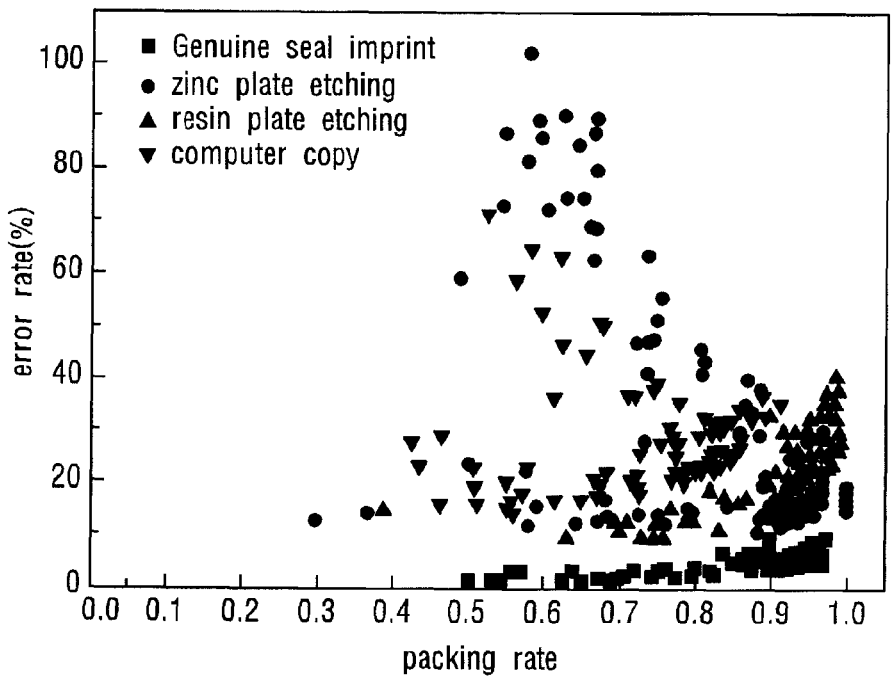
Figure 29:
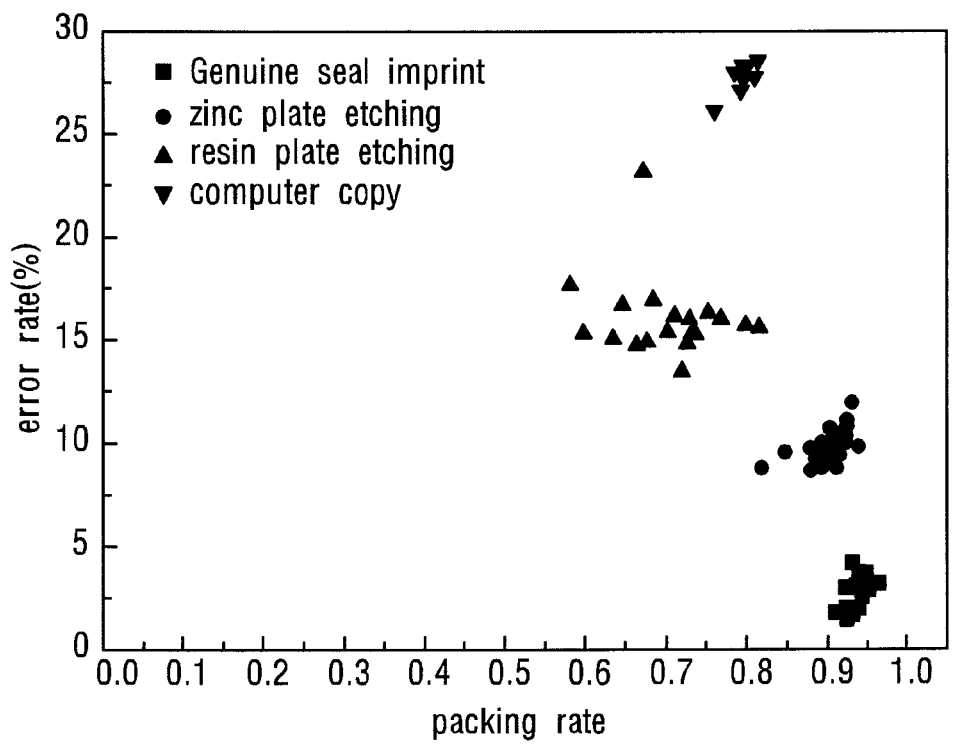

FIGS. 27, 28 and 29 illustrate scatter plots of the packing rates and the error rates of the genuine seal imprints shown in FIG. 26 and forged seal imprints obtained by the seals forged by zinc plate etching, resin plate etching and computer copy. The vertical axis represents the error rate ($\varepsilon$) and the horizontal axis represents the packing rate ($\rho$). The packing rates of the preparatory seal imprints are distributed in the range of 0.9 to 1.0, the error rates thereof are lower than 10%, and the error rates decrease as the packing rates decrease. Accordingly, when a straight line is extended from a point corresponding to an error rate of 0% and a packing rate of 0 to a point corresponding to an error rate higher than 0% and a packing rate of 1, a reference line on which it can be inspected whether a compared seal imprint is forged is generated. More specifically, when the straight line extended from the point corresponding to the error rate of 0% and the packing rate of 0 to the point corresponding to an error rate higher than 0% and the packing rate of 1 is set as the reference line, it is possible to determine that a compared seal imprint is forged when the compared seal imprint is located above the reference line and determine that the compared seal imprint is not forged when the compared seal imprint is located below the reference line. If a reference line is set on a graph having the horizontal axis representing the error rate and the vertical axis representing the packing rate through the aforementioned method, it is possible to determine that a compared seal imprint is forged when the compared seal imprint is located on the right of the reference line and determine that the compared seal imprint is not forged when the compared seal imprint is located on the left of the reference line.

A method of inspecting whether a compared seal imprint is forged according to another embodiment of the present invention will now be explained.

Figure 30:
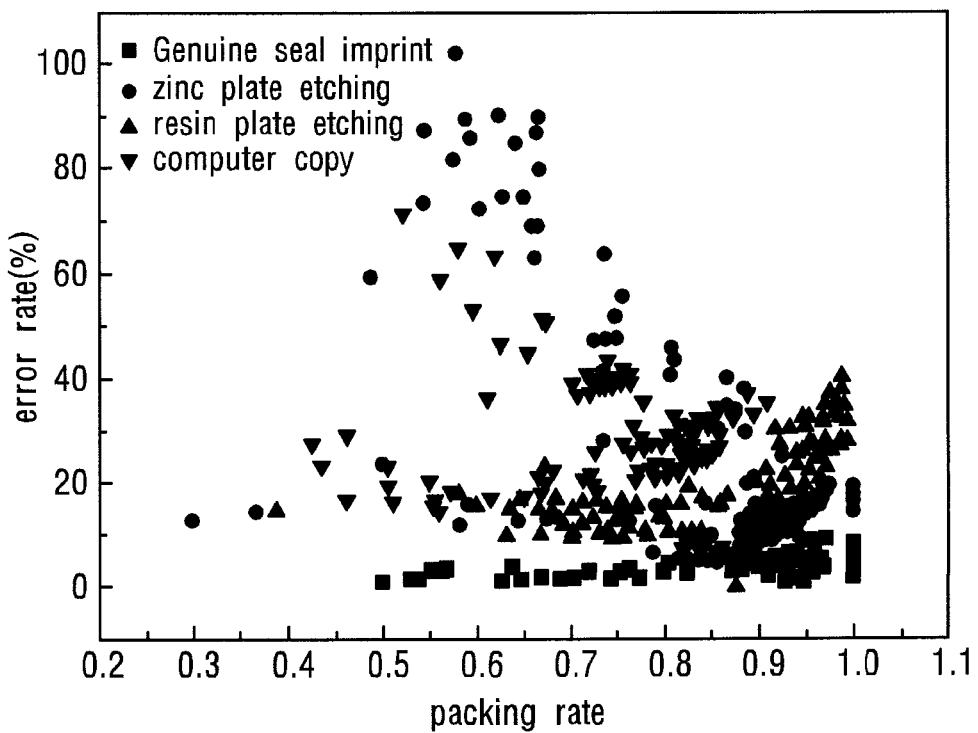
FIG. 30 is a scatter plot of packing rates and error rates of the four genuine seal imprints shown in FIG. 26 and forged seal imprints (compared seal imprints)
Figure 31:
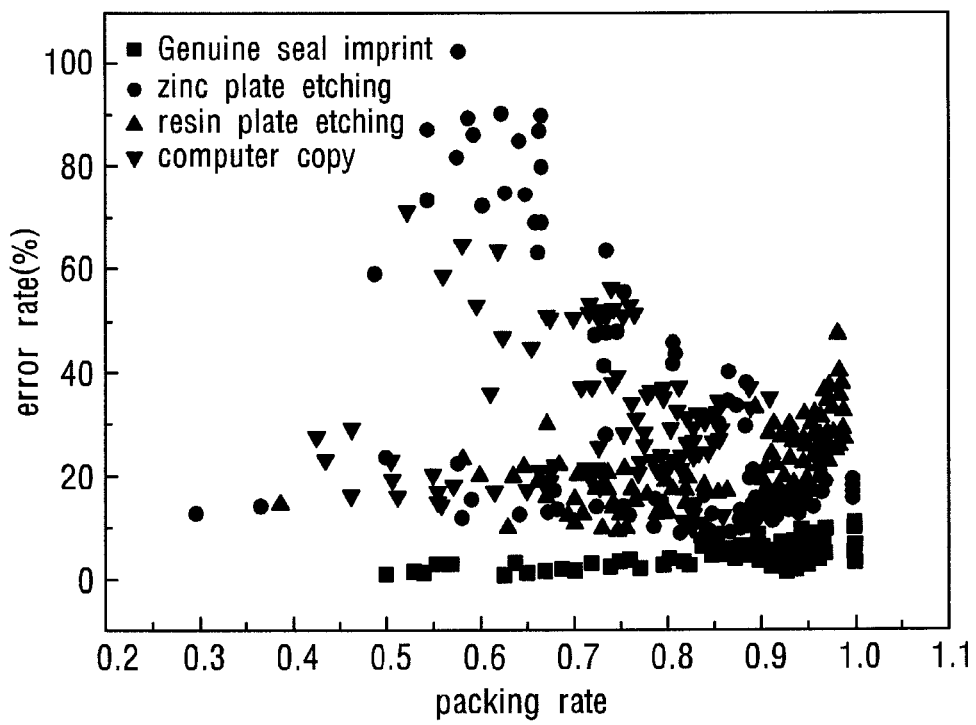
FIG. 31 is a scatter plot of packing rates and error rates of the four genuine seal imprints shown in FIG. 26 and forged seal imprints (compared seal imprints)

FIGS. 30 and 31 are scatter plots of the packing rates and the error rates of the four genuine seal imprints (reference seal imprints) shown in FIG. 26 and forged seal imprints (compared seal imprints). The horizontal axis of each graph represents an error rate corrected with the packing rate. Although it can be determined whether an arbitrary seal imprint is forged by using only the packing rate and the error rate of the arbitrary seal imprint, the error rate may be varied according to complexity of strokes of the seal imprint. That is, when a distance between stokes of a seal is narrow, the error rate may increase because stamping ink adhere to a recess of the seal. Furthermore, when stokes of a seal are not engraved with accuracy, the error rate may increase. Accordingly, the error rate may be normalized according to Equation 7 in consideration of the complexity of strokes of the reference seal imprint to generate a determination standard irrespective of seal type.

$$\varepsilon_2 = c \times \frac{l}{l_s} \times \frac{n(B)}{n(A_s)} \times \varepsilon \quad \text{[Equation 7]}$$

Here, $l_s$, $n(A)s$, $l$, $n(B)$ and $c$ respectively represent the length of the contour of a seal region of the reference seal imprint, the area of the seal region of the reference seal imprint, the length of the contour of a seal region of a compared seal imprint, the area of the seal region of the compared seal imprint, and a complexity constant (for example, 1.4).

FIGS. 32, 33, 34 and 35 show normal distribution curves obtained by performing Chi test on the packing rates and error rates of the preparatory seal imprints obtained by stamping the four genuine seals shown in FIG. 26 at a significance level of 5%. When the preparatory seal imprints are generated from the genuine seals and the normal distribution curves are obtained from the averages and standard deviations of the packing rates and error rates, it is possible to confirm the position of a compared seal imprint on the normal distribution curves so as to determine whether the compared seal imprint is forged.

More specifically, the genuine seals are stamped multiple times to generate the preparatory seal imprints, the normal distribution curves are generated using the averages and standard deviations of the error rates ($\varepsilon$) and the packing rates ($\rho$) of the preparatory seal imprints, and the position of the corrected error rate of the compared seal imprint is checked. The error rates of the preparatory seal imprints are calculated according to Equation 2 and the packing rates of the preparatory seal imprints are calculated according to Equation 1. In Equations 1 and 2, $n(A)$ represents the area of the seal region of the reference seal imprint, $n(B)$ represents the area of the seal region of each preparatory seal imprint, and $n(B_{out})$ of a portion of the seal region of each preparatory seal imprint, which is not included in the seal region of the reference seal imprint. Then, the error rates are corrected with the packing rates according to Equation 6 to obtain corrected error rates ($\varepsilon_1$), and a normal distribution curves of the preparatory seal imprints is generated using the average and standard deviation of the corrected error rates. In the same manner, the corrected error rate of the compared seal imprinted is calculated.

Figure 32:
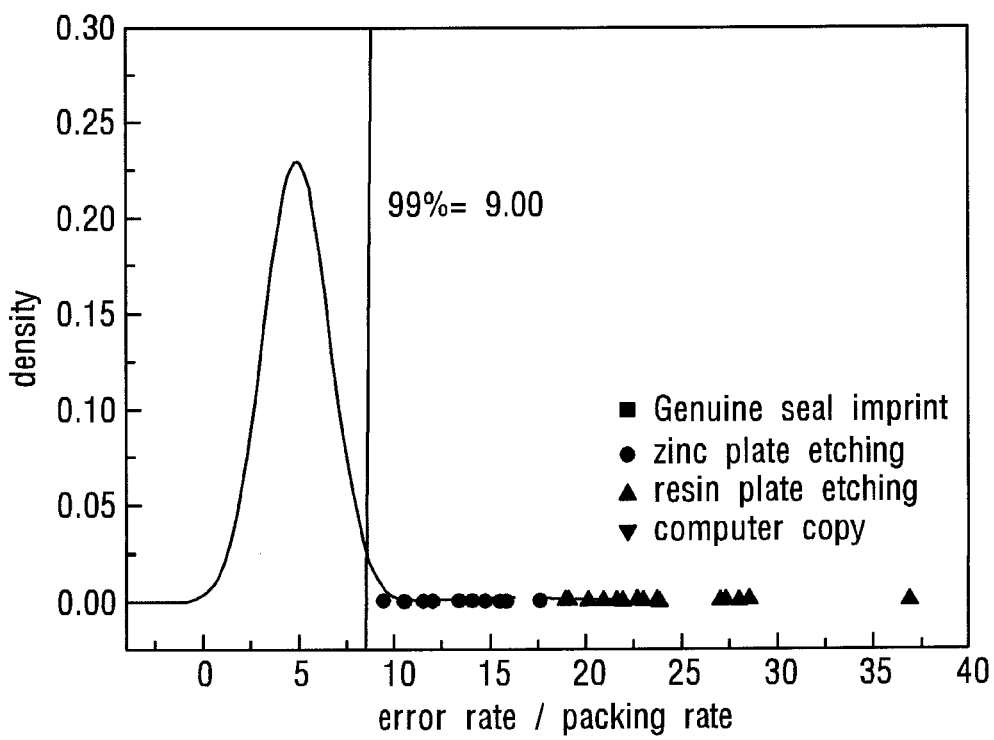
FIGS. 32, 33, 34 and 35 illustrate distributions of normalized error rates with respect to the four genuine seal imprints shown in FIG. 26.
Figure 33:
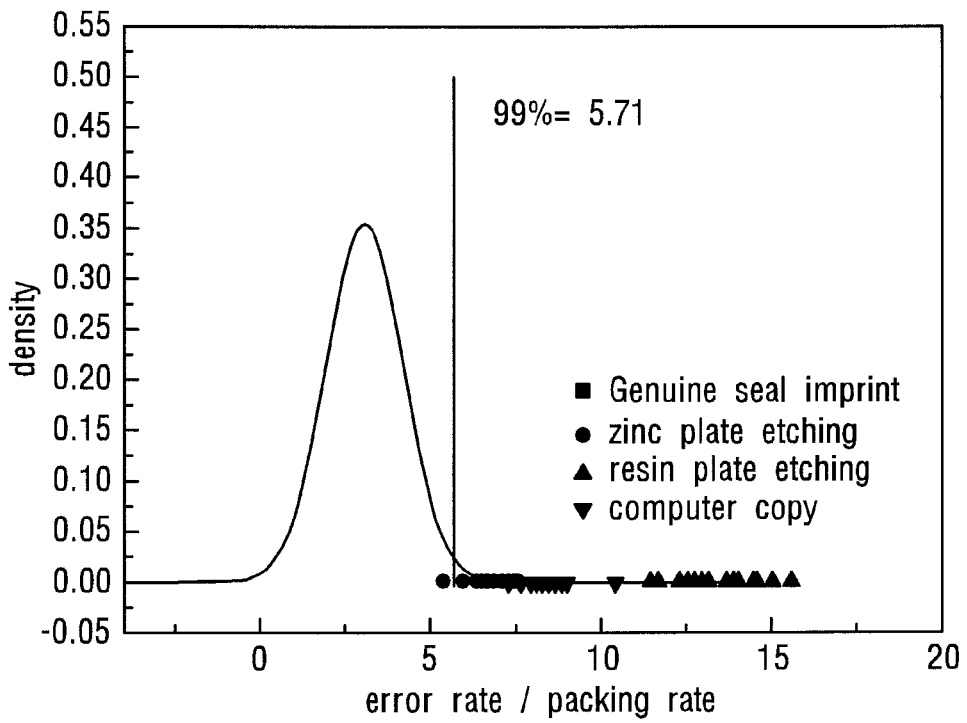
Figure 34:
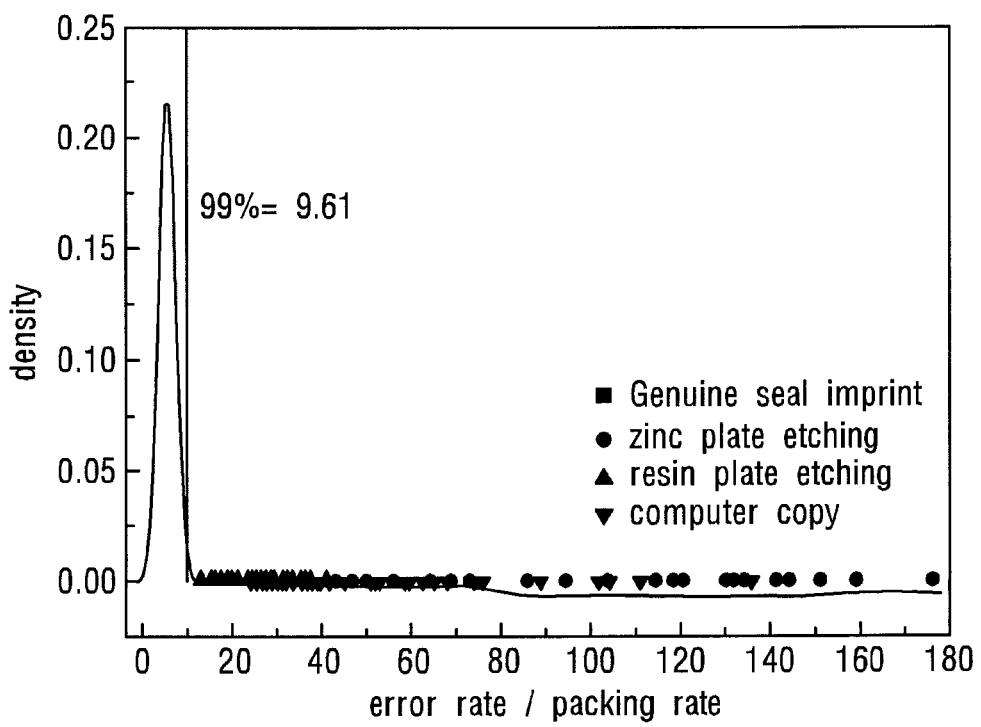
Figure 35:
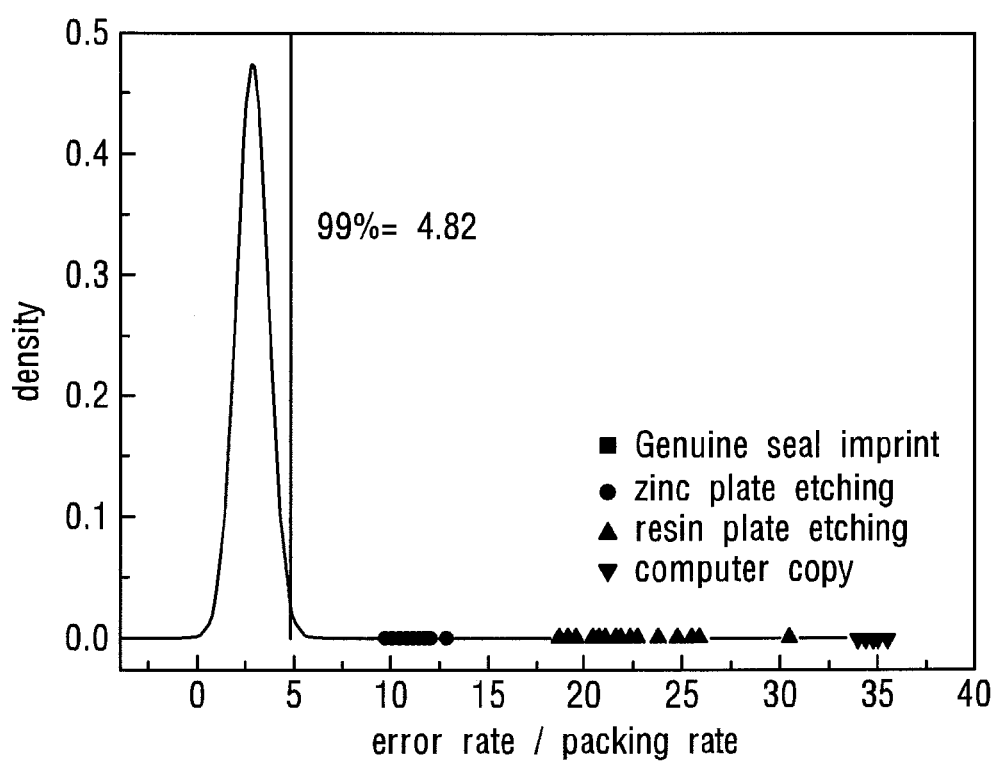

FIG. 32 illustrates frequency distribution of the error rates/packing rates of compared seal imprints with respect to the reference seal imprint. Referring to FIG. 32, only one of compared seal imprints obtained by a seal forged by zinc plate etching is included in 99% genuine seal imprint. FIGS. 33, 34 and 35 illustrate frequency distributions of the error rates/packing rates of the second, third and fourth seal imprints shown in FIG. 26. Referring to FIGS. 33, 34 and 35, almost all forged seal imprints are not included in 99%.

As described above, the forged seal imprint inspection method according to the present invention may be embodied as a computer readable program and stored in recording media (such as CD-ROM, RAM, ROM, memory cards, hard discs, optical magnetic discs, etc.).

The present invention can provide objective data for determining whether a compared seal imprint on a document is forged.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A forged seal imprint inspection method comprising:

obtaining, by a computer, one or more genuine seal imprints to generate comparative seal imprints;

generating, by the computer, a reference seal imprint by averaging the comparative seal imprints;

obtaining, by the computer, a compared seal imprint to be inspected;

calculating, by the computer, characteristic values of the comparative seal imprints by comparing the comparative seal imprints with the reference seal imprint;

calculating, by the computer, characteristic values of the compared seal imprint by comparing the compared seal imprint with the reference seal imprint;

comparing, by the computer, the characteristic values of the comparative seal imprints with the characteristic values of the compared seal imprint; and determining, by the computer, whether the compared seal imprint is forged, based on said comparing of the characteristic values, wherein the characteristic values of the comparative seal imprints include packing rates, the packing rates of the comparative seal imprints being calculated according to $$\rho1 = 1 - \frac{n(A) - (n(B1) - n(B1 \text{ out}))}{n(A)},$$

where $\rho1$ represents the packing rate of each of the comparative seal imprints, $n(A)$ represents an area of a seal region of the reference seal imprint, $n(B1)$ represents an area of a seal region of each of the comparative seal imprints, and $n(B1\text{out})$ represents an area of a portion of the seal region of each of the comparative seal imprints which is not included in the seal region of the reference seal imprint, and wherein the characteristic values of the compared seal imprint include a packing rate, the packing rate of the compared seal imprint being calculated according to $$\rho 2 = 1 - \frac{n(A) - (n(B2) - n(B2\ out))}{n(A)},$$

where ρ2 represents the packing rate of the compared seal imprint, n(A) represents the area of the seal region of the reference seal imprint, n(B2) represents an area of a seal region of the compared seal imprint, and n(B2out) represents an area of a portion of the seal region of the compared seal imprint which is not included in the seal region of the reference seal imprint.

2. The forged seal imprint inspection method of claim 1, wherein the characteristic values of the comparative seal imprints include error rates with respect to the reference seal imprint, the error rates of the comparative seal imprints being calculated according to $$\varepsilon 1 = \frac{n(B1\ out)}{n(B1)} \times 100,$$

where ϵ1 represents the error rate of each of the comparative seal imprints, and
  wherein the characteristic values of the compared seal imprint include an error rate with respect to the reference seal imprint, the error rate of the compared seal imprint being calculated according to $$\varepsilon 2 = \frac{n(B2\ out)}{n(B2)} \times 100,$$

where ϵ2 represents the error rate of the compared seal imprint.

3. A non-transitory computer readable recording medium recording a computer program to execute the method of claim 2.

4. A non-transitory computer readable recording medium recording a computer program to execute the method of claim 1.

5. A forged seal imprint inspection method comprising:
  obtaining, by a computer, one or more genuine seal imprints to generate multiple preparatory seal imprints;
  separating, by the computer, each of the preparatory seal imprints into regions;
  generating, by the computer, a reference seal imprint by averaging seal regions of the preparatory seal imprints;
  obtaining, by the computer, a compared seal imprint to be inspected;
  separating, by the computer, the compared seal imprint into regions;
  comparing, by the computer, the reference seal imprint with a seal region of the compared seal imprint; and
  calculating, by the computer, characteristic values of the compared seal imprint with respect to the reference seal imprint; and
  determining, by the computer, whether the compared seal imprint is forged, based on the characteristic values of the compared seal imprint,
  wherein the characteristic values of the compared seal imprint include a packing rate, the packing rate of the compared seal imprint being calculated according to $$\rho = 1 - \frac{n(A) - (n(B) - n(B_{out}))}{n(A)},$$

where ρ represents the packing rate of the compared seal imprint, n(A) represents an area of a seal region of the reference seal imprint, n(B) represents an area of the seal region of the compared seal imprint, and n(Bout) represents an area of a portion of the seal region of the compared seal imprint which is not included in the seal region of the reference seal imprint.

6. The forged seal imprint inspection method of claim 5, wherein the characteristic values of the compared seal imprint include an error rate, the error rate of the compared seal imprint being calculated according to $$\varepsilon = \frac{n(B_{out})}{n(B)} \times 100,$$

where ϵ represents the error rate of the compared seal imprint.

7. The forged seal imprint inspection method of claim 6, wherein the packing rate is reflected in the error rate and the error rate in which the packing rate is reflected is calculated according to $$\varepsilon_1 = \frac{\varepsilon}{\rho}.$$

8. A non-transitory computer readable recording medium recording a computer program to execute the method of claim 6.

9. A non-transitory computer readable recording medium recording a computer program to execute the method of claim 5.

* * * * *